(12) United States Patent
Sanders et al.

(10) Patent No.: US 11,756,757 B1
(45) Date of Patent: Sep. 12, 2023

(54) VACUUM BREAK SWITCH OPEN AND CLOSED INDICATOR

(71) Applicants: Dean Carnell Sanders, Clements, CA (US); Elliott James Gist, Modesto, CA (US)

(72) Inventors: Dean Carnell Sanders, Clements, CA (US); Elliott James Gist, Modesto, CA (US)

(73) Assignee: nertial Engineering and Machine Works, Inc., Stockton, CA (US)

( * ) Notice: Subject to any disclaimer, the term of this patent is extended or adjusted under 35 U.S.C. 154(b) by 0 days.

(21) Appl. No.: 18/094,307

(22) Filed: Jan. 6, 2023

Related U.S. Application Data

(63) Continuation of application No. 18/093,198, filed on Jan. 4, 2023.

(51) Int. Cl.
*H01H 33/664* (2006.01)
*H01H 33/662* (2006.01)
*H01H 33/666* (2006.01)

(52) U.S. Cl.
CPC ........ *H01H 33/664* (2013.01); *H01H 33/662* (2013.01); *H01H 2033/6665* (2013.01); *H01H 2239/05* (2013.01)

(58) Field of Classification Search
CPC ........ H01H 3/66–2033/6686; H02B 13/00–08
See application file for complete search history.

(56) References Cited

U.S. PATENT DOCUMENTS

| | | | |
|---|---|---|---|
| 9,685,280 B2 | 6/2017 | Benson et al. | |
| 10,410,812 B2 | 9/2019 | Zhu et al. | |
| 10,418,804 B2 | 9/2019 | Staszesky et al. | |
| 10,504,678 B2 | 12/2019 | Smith et al. | |
| 10,600,593 B2 | 3/2020 | Falkingham | |
| 10,643,808 B2 | 5/2020 | Falkingham | |
| 10,818,455 B2 | 10/2020 | Djogo | |
| 10,964,496 B2 | 3/2021 | Rusev et al. | |
| 11,081,878 B2 | 8/2021 | Montenegro et al. | |
| 11,087,940 B2 | 8/2021 | Falkingham | |
| 11,303,109 B2 | 4/2022 | Montenegro et al. | |
| 2013/0036965 A1* | 2/2013 | Bindics | H01H 9/16 116/286 |
| 2015/0318132 A1* | 11/2015 | Sato | H01H 33/38 335/154 |
| 2022/0375708 A1* | 11/2022 | Simonelli | H01H 33/6662 |

* cited by examiner

*Primary Examiner* — Jared Fureman
*Assistant Examiner* — Christopher J Clark
(74) *Attorney, Agent, or Firm* — Kenneth Altshuler

(57) ABSTRACT

An underarm gang operated vacuum break switch (underarm switch) has an electrically live portion under a mounting arm, which provides advantages over the standard vacuum break switch, which have the electrically live portion above the mounting arm. Because the non-electrified mounting arm is above the electrified portion, the underarm switch is safer for perching birds and other wildlife. The nature of the underarm switch also provides other benefits including a disconnect blade that when opened creates a visual gap to ensure electrical discontinuity along with a safety locking arm tied to deactivating the underarm switch. Adding to the safety measures is a visual indicator that shows an electrician when the switch is live and safe to open the disconnect blade. Other safety measures include a shock absorber assembly and inertia slowing mass protecting electrical contacts within the vacuum break switch from failing.

20 Claims, 26 Drawing Sheets

VACUUM BREAK SWITCH OPEN AND CLOSED INDICATOR

CROSS-REFERENCE TO RELATED APPLICATIONS

This application is a continuation patent application claiming priority to and the benefit of patent application Ser. No. 18/093,198, entitled Underarm Gang Operated Vacuum Break Switch filed Jan. 4, 2023, the entire disclosure of which is hereby incorporated by reference.

FIELD OF THE INVENTION

The present embodiments are directed to an overhead powerline vacuum break switch.

DESCRIPTION OF RELATED ART

An electrical power distribution network, or electrical grid, generally comprises one or more power generation plants that source electricity to homes, businesses, or other end-users by way of an electrical transmission system. More specifically, power generation plants, such as nuclear power plants, coal power plants, hydro-electric power plants, etc., generate electricity that is channeled to the electrical transmission system. The electrical transmission system, in turn, steps up voltage to a transmission efficient high AC voltage, via transformers, that is carried by way of high voltage power lines to substations that lower voltage to three-phase feeder power lines. The three-phase feeder power lines carry the electricity to the end-users. As with the high-voltage power lines, the reduced voltage of the three-phase feeder power lines is still dangerously high to people. Accordingly, disconnect switches are among the key components that make up the electrical transmission system.

There are a variety of disconnect switches that are used to interrupt power in transmission lines. One popular disconnect switch is from a family of vacuum disconnect switches (or simply, vacuum disconnects) because of the reduced sparking when actuated open and closed. The most common vacuum disconnects include a contact switch inside of a porcelain ceramic vacuum bottle, which is insulated by SF-6 gas. Some problems with present-day vacuum bottle disconnects is fragility of the porcelain ceramic when opening and closing the contact switch inside the bottle not to mention the environmentally harmful SF-6 gas, which is being discontinued under new environmental regulations.

It is to improvements related to vacuum break switches that embodiments of the present invention are directed.

SUMMARY OF THE INVENTION

The present embodiments generally relate to overhead powerline vacuum break switches.

More specifically, certain embodiments of the present invention are directed to underarm overhead powerline vacuum break switches that in certain embodiments can comprise a stationary post insulator and a rotating spindle insulator that are both connected to a phase base cross bar. The underarm vacuum break switch arrangement is configured to connect two overhead powerlines via a powerline pathway. In this embodiment, the powerline pathway includes a first powerline connector that is connected to the first overhead powerline via a powerline bypass junction, a second powerline connector that is connected to the second overhead powerline via another powerline bypass junction, a vacuum switch and a disconnect blade. The stationary post insulator, the rotating spindle insulator and the phase base cross bar are not along the powerline pathway, which should be appreciated because in order for the underarm vacuum break switch arrangement to switch electricity off along the powerline at the powerline bypass, no electricity can bypass the powerline pathway when it is broken, which by definition means that there is no electrical continuity between the powerline bypass junctions. The vacuum switch hangs from the phase base cross bar via the stationary post insulator and the rotating spindle insulator. The disconnect blade generally includes a disconnect latch that when in a latched state and with the disconnect blade closed, there is electrical continuity between the vacuum switch and the second powerline connector via the disconnect blade. However, when the disconnect latch is in an unlatched state and the disconnect is opened there is electrical discontinuity between the vacuum switch and the second powerline connector via an airgap from the disconnected blade that at least partially hangs, and in this case completely hangs from a hinge, which in this embodiment is an axle pinning the disconnect blade to a hanger extending downwards from the disconnect blade busbar, but the hinge can easily be a number of different hinge arrangements known to those in the mechanical art.

In another embodiment of the present invention involving an airgap that is formed by an open disconnect blade contemplates a powerline break switch arrangement generally comprising a powerline pathway that is configured to provide electrical continuity between a first overhead powerline and a second overhead power line. The powerline pathway is defined by a plurality of components, or simply "components", comprising a vacuum switch, a disconnect blade, a first powerline connector that is configured to connect to the first overhead powerline and a second powerline connector that is configured to connect to the second overhead powerline. The powerline break switch arrangement further comprises a stationary post insulator and a rotating spindle insulator that are connected to and interposed between a cross bar and the components. The cross bar is insulated from the powerline pathway via the stationary post insulator and a rotating spindle insulator, to isolate the powerline pathway from being bypassed along the cross bar. When the powerline break switch arrangement is mounted to a utility pole, the cross bar is further away from the ground than the components. In this embodiment, the vacuum switch and the second powerline connector are electrically connected when the disconnect blade is in a latched orientation, that is when it is "up"/not hanging and connected. In the alternative, the vacuum switch and the second powerline connector are electrically disconnected when the disconnect blade is in an unlatched orientation and at least partially hanging from a hinge.

Yet another embodiment of the present invention involving an airgap that is formed by an open disconnect blade contemplates a method that includes providing a powerline break switch arrangement comprising a powerline pathway that provides electrical continuity between a first overhead powerline and a second overhead power line. The powerline pathway is defined by components comprising a vacuum switch, a disconnect blade, a first powerline connector and a second powerline connector. The first powerline connector is configured and arranged to connect to the first overhead powerline and the second powerline connector is configured to connect to the second overhead powerline. The powerline break switch arrangement further comprises a stationary post insulator and a rotating spindle insulator, which are connected to a cross bar and the components. The stationary post insulator and the rotating spindle insulator are interposed between the cross bar and the components. The cross bar is insulated from the powerline pathway via the stationary post insulator and a rotating spindle insulator. The method continues with the step for mounting the powerline break switch arrangement to a utility pole with the cross bar being further away from the ground than the components. Once electricity is running through the powerline break switch arrangement, the flow of electricity can be halted by electrically disconnecting the vacuum switch from the second powerline connector, which is accomplished by actuating the vacuum switch mechanism to open, then by moving the disconnect blade from a latched orientation to an unlatched orientation. The unlatched and opened orientation can be viewed from the ground by the air gap created when the disconnect blade is dangling from the powerline break switch arrangement.

Yet other embodiments of the present invention contemplate a vacuum bottle insulator used to electrically insulate a vacuum bottle, wherein an overhead power line vacuum switch can generally comprise a vacuum bottle arrangement that includes a vacuum bottle containing a fixed electrical contact and a dynamic electrical contact. The vacuum bottle has an insulated tubular member that extends between a fixed contact end and a dynamic contact end. At least 75% of the tubular member is encapsulated in a urethane insulator. A rigid fiberglass shell is sandwiched between an outer silicone ice-and-water shield housing and the urethane insulator. The dynamic electrical contact is fixedly attached to an actuator that is configured to drive the dynamic electrical contact in either an open state or a closed state with the fixed electrical contact, wherein the open state is when the dynamic electrical contact is spaced apart from the fixed electrical contact and the closed state is when the dynamic electrical contact is in contact with the fixed electrical contact.

Still, another embodiment of a vacuum bottle insulator used to prevent the flow of electricity across the ends of a vacuum bottle switch envisions a method directed to a vacuum bottle switch that includes a vacuum bottle arranged with a tubular portion extending along an axis between a fixed contact bottle end and a dynamic contact bottle end, the vacuum bottle comprising an internal vacuum chamber, the vacuum bottle switch defined between a first end and a second end. The method includes a step for flowing electricity between the first end and the second end through a fixed electrical contact and a dynamic electrical contact when electrically connected. The fixed electrical contact extends into the internal vacuum chamber from the first end and a dynamic electrical contact extends into the internal vacuum chamber from the second end. A step for halting the flow of the electricity through the fixed electrical contact and the dynamic electrical contact is accomplished by separating the fixed electrical contact and the dynamic electrical contact. The vacuum bottle switch arrangement comprises an insulating vacuum bottle switch housing that prevents essentially/virtually any of the electricity from flowing between the first end and the second end when the fixed electrical contact and the dynamic electrical contact are separated. The insulating bottle switch housing surrounds the tubular portion by a urethane insulator that is at least partially surrounded by a rigid shell that is at least partially surrounded by an ice-and-water shield housing.

Another inventive aspect of the present invention is directed to a shock absorber that is inside of the mechanical actuator. The shock absorber is used to reduce the moving mass and kinetic energy of the mechanism linkage during the closing event in the vacuum switch and contemplates a power line vacuum switch comprising a vacuum bottle switch that includes a fixed electrical contact and a dynamic electrical contact which includes an open/close circuit linkage that is connected to the dynamic electrical contact via a dynamic contact shaft and shock absorber assembly. The shock absorber generally comprises a housing with a base and a shock absorber housing port that is opposite to the base, a coil spring disposed inside of the housing and connected to the base, wherein the open/close circuit linkage is connected to the base outside of the housing. The power line vacuum switch has an open orientation with the coil spring in an uncompressed state when the dynamic electrical contact is separated from the fixed electrical contact and a closed orientation with the coil spring in a compressed state when the dynamic electrical contact is connected to the fixed electrical contact. The open/close circuit linkage is spaced closer to the fixed electrical contact in the closed orientation as compared to the open orientation. The coil spring, the base, the fixed electrical contact, the dynamic electrical contact, and the shock absorber housing port are symmetric about a vacuum bottle assembly axis.

Still, another embodiment of the present invention using a shock absorber in a method to reduce the kinetic energy contact between a fixed electrical contact and a dynamic electrical contact inside of a vacuum bottle. The method can comprise a step for moving the dynamic electrical contact from an open orientation to a closed orientation relative to the fixed electrical contact via an open/close circuit linkage, wherein the closed orientation is when the fixed electrical contact is connected to the dynamic electrical contact. A step for resisting the moving step via a coil spring that is interposed between a dynamic contact shaft, which is connected to the dynamic electrical contact and a linkage platform. The dynamic contact shaft cooperates with the coil spring during the resisting step.

Another inventive aspect of the present invention is directed to a shock absorber that is inside of the mechanical actuator. The shock absorber is used to reduce the moving mass and kinetic energy of the mechanism linkage during the closing event in the vacuum switch and contemplates a power line vacuum switch comprising a vacuum bottle switch that includes a fixed electrical contact and a dynamic electrical contact which includes an open/close circuit linkage that is connected to the dynamic electrical contact via a dynamic contact shaft and shock absorber assembly. The shock absorber generally comprises a housing with a base and a shock absorber housing port that is opposite to the base, a coil spring disposed inside of the housing and connected to the base, wherein the open/close circuit linkage is connected to the base outside of the housing. The power line vacuum switch has an open orientation with the coil spring in an uncompressed state when the dynamic electrical contact is separated from the fixed electrical contact and a closed orientation with the coil spring in a compressed state when the dynamic electrical contact is connected to the fixed electrical contact. The open/close circuit linkage is spaced closer to the fixed electrical contact in the closed orientation as compared to the open orientation. The coil spring, the base, the fixed electrical contact, the dynamic electrical contact, and the shock absorber housing port are symmetric about a vacuum bottle assembly axis.

Still, another embodiment of the present invention using a shock absorber to reduce the moving mass and kinetic energy of the mechanism linkage during the closing event between a fixed electrical contact and a dynamic electrical contact inside of a vacuum bottle. The method can comprise a step for moving the dynamic electrical contact from an open orientation to a closed orientation relative to the fixed electrical contact via an open/close circuit linkage, wherein the closed orientation is when the fixed electrical contact is connected to the dynamic electrical contact. A step for resisting the moving step via a coil spring that is interposed between a dynamic contact shaft, which is connected to the dynamic electrical contact and a linkage platform. The dynamic contact shaft cooperates with the coil spring during the resisting step.

Another inventive aspect of the present invention is generally directed to an open/close indicator that visually shows an onlooker that the vacuum switch has continuity (is live). Related embodiments contemplate a power line vacuum switch comprising a vacuum bottle switch actuator and a vacuum bottle switch that includes a fixed electrical contact and a dynamic electrical contact. The vacuum bottle switch actuator includes a linkage assembly that is configured to drive the power line vacuum switch in an open orientation defined when the dynamic electrical contact is separated from the fixed electrical contact and in a closed orientation when the dynamic electrical contact is contacting the fixed electrical contact. The power line vacuum switch further includes an indicator shaft that extends orthogonally from the linkage assembly, wherein the indicator shaft is rotated in a first position when in the open orientation and in a second position when in the closed orientation. The indicator shaft is rotated in the first and the second positions via the linkage assembly. An open/close indicator is attached to the indicator shaft, covering a shaft distal end of the indicator shaft. The open/close indicator is configured to visibly show when the power line vacuum switch is in the open orientation via the indicator shaft being rotated in the first position or the closed orientation when the indicator shaft is rotated in the second position.

In yet another open/close indicator embodiment a vacuum switch arrangement can comprise a fixed electrical contact and a dynamic electrical contact disposed in a vacuum bottle. A linkage assembly that is inside of a vacuum bottle switch actuator, moves the dynamic electrical contact from an open orientation, where the dynamic electrical contact is spaced apart from the fixed electrical contact, to a closed orientation, where the dynamic electrical contact is in contact with the fixed electrical contact. An indicator shaft is connected to and extends orthogonally from the linkage assembly. The indicator shaft is configured to rotate between a first position and a second position via the linkage assembly, wherein the open orientation corresponds to the indicator shaft being in the first position and the closed orientation corresponds to the indicator shaft in the closed position. An open/close indicator is attached to the indicator shaft, wherein the open/close indicator visibly displays an open orientation indicia when the indicator shaft is in the first position and a closed orientation indicia when the indicator shaft is in the second position.

Certain aspects of yet another open/close indicator embodiment envision a method of using a vacuum switch arrangement having a fixed electrical contact and a dynamic electrical contact disposed in a vacuum bottle, a linkage assembly that is inside of a vacuum bottle switch actuator, an indicator shaft connected to and extending orthogonally from the linkage assembly, and an open/close indicator attached to the indicator shaft. The method envisions moving the dynamic electrical contact from an open orientation, where the dynamic electrical contact is spaced apart from the fixed electrical contact, to a closed orientation, where the dynamic electrical contact is in contact with the fixed electrical contact. This moving step will cause the indicator shaft to rotate about an axis between a first position and a second position via the linkage assembly. The open orientation corresponds to the indicator shaft being in the first position and the closed orientation corresponds to the indicator shaft being in the closed position. Once rotated, the open/close indicator visibly displays an open orientation indicia when the indicator shaft is in the first position and a closed orientation indicia when the indicator shaft is in the second position.

DETAILED DESCRIPTION

Figure 1A:
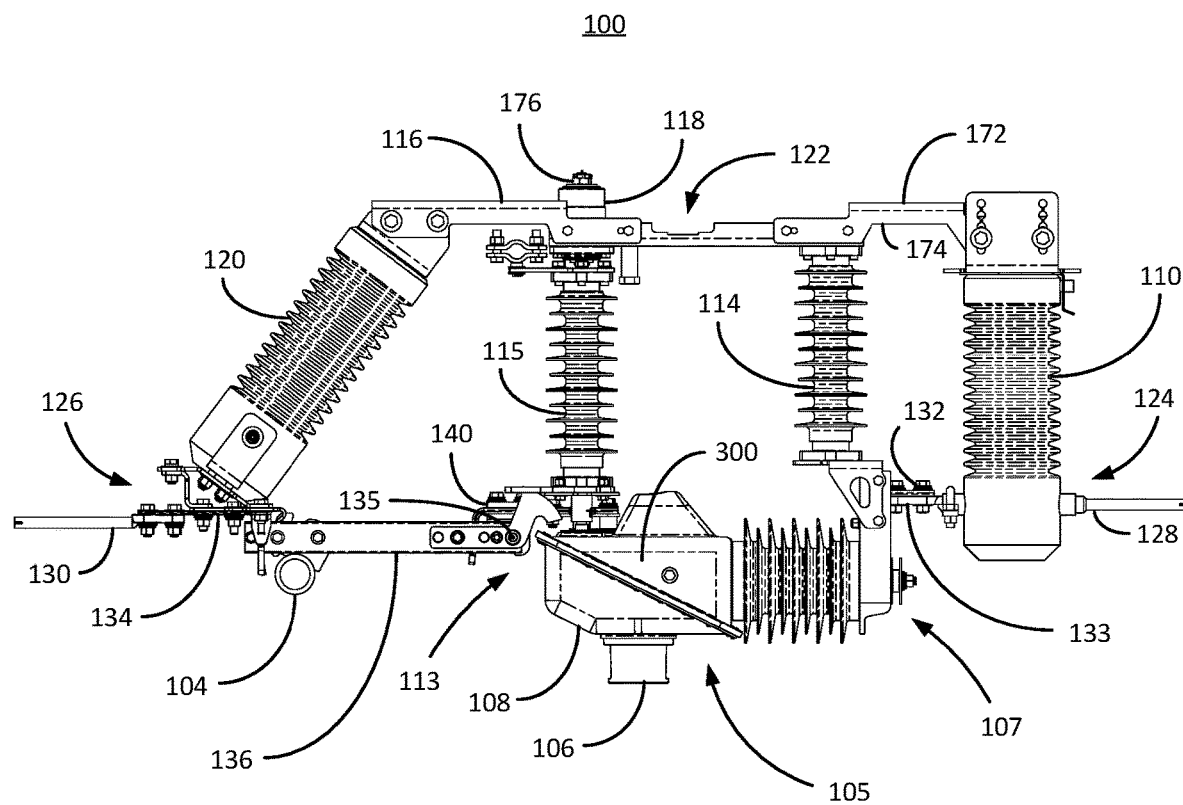
FIGS. 1A-1C are line drawings that illustratively depict a gang operated underarm vacuum break switch arrangement consistent with embodiments of the present invention.

Initially, this disclosure is by way of example only, not by limitation. Thus, although the instrumentalities described herein are for the convenience of explanation, shown and described with respect to exemplary embodiments, it will be appreciated that the principles herein may be applied equally in other similar configurations involving similar uses of the technology put forth in the field of the invention. The phrases "in one embodiment", "according to one embodiment", and the like, generally mean the particular feature, structure, or characteristic following the phrase, is included in at least one embodiment of the present invention and may be included in more than one embodiment of the present invention. Importantly, such phases do not necessarily refer to the same embodiment. If the specification states a component or feature "may", "can", "could", or "might" be included or have a characteristic, that particular component or feature is not required to be included or have the characteristic. As used herein, the terms "having", "have", "including" and "include" are considered open language and are synonymous with the term "comprising". Furthermore, as used herein, the term "essentially" is meant to stress that a characteristic of something is to be interpreted within acceptable tolerance margins known to those skilled in the art in keeping with typical normal world tolerance, which is analogous with "more or less." For example, essentially flat, essentially straight, essentially on time, etc. all indicate that these characteristics are not expected or even capable of being perfect within the sense of their limits. Accordingly, if there is no specific+/- value assigned to "essentially", then it is to be assumed that "essentially" has a default meaning to be within +/-2.5% of exact. The term "connected to" as used herein is to be interpreted as a first element physically linked or attached to a second element and not as a "means for attaching" as in a "means plus function". In fact, unless a term expressly uses "means for" followed by the gerund form of a verb, that term shall not be interpreted under 35 U.S.C. § 112(f). In what follows, similar or identical structures may be identified using identical callouts.

With respect to the drawings, it is noted that the figures are not necessarily drawn to scale and are diagrammatic in nature to illustrate features of interest. Descriptive terminology such as, for example, upper/lower, top/bottom, horizontal/vertical, left/right and the like, may be adopted with respect to the various views or conventions provided in the figures as generally understood by an onlooker for purposes of enhancing the reader's understanding and is in no way intended to be limiting. All embodiments described herein are submitted to be operational irrespective of any overall physical orientation unless specifically described otherwise, such as elements that rely on gravity to operate, for example.

Certain embodiments of the present invention generally relate to an underarm gang operated vacuum break switch with an in-line disconnect, (or simply, underarm vacuum break switch arrangement). The underarm vacuum break switch arrangement is so named because the electrically live portion of the vacuum break switch is under the mounting arm, as referred to as a phase base cross bar. The underarm vacuum break switch arrangement distinguishes over other vacuum break switches that have the electrically live portion above the mounting arm. Because the mounting arm is not electrified and is above the electrified arm portion, the underarm vacuum break switch arrangement is considerably safer for perching birds and other wildlife. In addition, the nature of the underarm vacuum break switch arrangement provides other benefits including an interlocked in-line disconnect blade that is only operable once the vacuum switch has been opened, therefore adding a visual gap to ensure discontinuity with the switch. Adding to the safety measures is a visual indicator that shows an electrician when the switch is live or not thereby indicating when it is safe to open the disconnect blade with a hot stick. Other safety measures include a shock absorber assembly and inertia slowing mass that help protect electrical contacts within the vacuum break switch from failing. The following description details innovation like these.

Figure 1B:
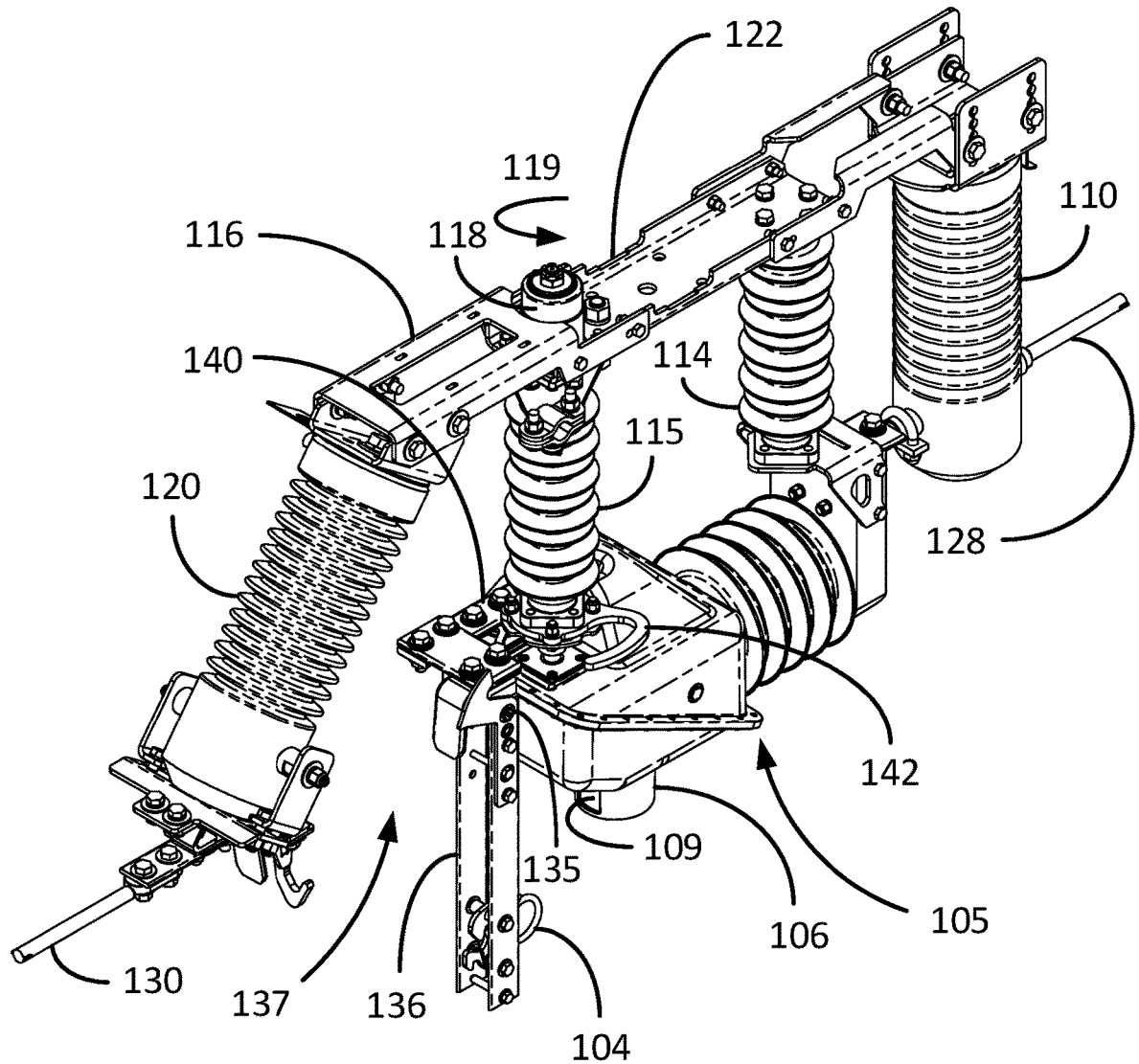

FIG. 1A is a side view line drawing of an underarm gang operated vacuum break switch with in-line disconnect (hereinafter "underarm vacuum switch arrangement") consistent with embodiments of the present invention. The underarm vacuum break switch arrangement 100 generally includes a vacuum (break) switch 105 that is hanging from a phase base cross bar 116 via a stationary post insulator 114 and rotating spindle insulator 115 (stationary post insulator with rotating inner spindle). Though in the present embodiment the vacuum switch 105 hangs from the phase base cross bar 116 at the cross bar bottom side 174, certain embodiments envision the stationary post insulator 114 and rotating spindle insulator 115 being rigidly attached to the vacuum switch 105 and the phase base cross bar 116 in a manner that if the underarm vacuum switch arrangement 100 were turned on its side, nothing would appreciably bend or move out of place. Unlike the stationary post insulator 114, the rotating spindle insulator 115 comprises a rotating spindle 118 that passes axially through the center of the post insulator portion of the rotating spindle insulator 115. The rotating spindle 118 can be connected to a vacuum switch motor and/or motorized linkage at a spindle motor mount 176 on the cross bar top side 172 (not shown but that is attached to a utility pole 155, of FIG. 1D, along with the underarm vacuum switch arrangement) that is configured to rotate the rotating spindle 118 to open the vacuum switch 105. When the vacuum switch 105 is open, current cannot pass from the right terminal end 124 to the left terminal end 126 (i.e., there is no electrical continuity between the left terminal 130 and the right terminal 128). In certain embodiments, the motorized linkage comprises a control rod (not shown) that moves up and down by way of the vacuum switch motor. The control rod operates as bell crank that then rotates the rotating spindle 118, though there a many other ways to rotate the rotating spindle 118 known to those skilled in the art. When the vacuum switch 105 is in either an open or closed state, an open/close indicator 106 (located at the actuator mechanism 300 down facing cover 108) visually depicts the state of the vacuum switch 105 that can be visibly seen by an onlooker, e.g., an electrician, underneath the underarm vacuum break switch arrangement 100. The rotating spindle 118 allows the disconnect blade 136 to drop down (hinge open and hang via gravity, via a hinge 135) only when the vacuum switch 105 is open, as shown in FIG. 1B. The disconnect blade 136 is dropped down (where it dangles), in an open configuration, by way of a hot stick (not shown) used to pull down on a disconnect blade ring 104, which is done by an electrician. The open oriented disconnect blade 136 definitively shows a visual break (i.e., no power running through the switch 100) in any electrical connection between the right terminal end 124 and the left terminal end 126. This is a protective measure for an electrician working on the underarm vacuum break switch arrangement 100. In the current configuration of FIG. 1A, when the vacuum switch 105 is closed, electricity can be made to flow through the disconnect blade 136 between a disconnect blade busbar 140 and the left terminal 130.

With continued reference to FIG. 1A, both current and voltage can be sampled or otherwise sensed by a current and voltage sensor 110 at the right terminal end 124. Only the voltage can be sampled via a voltage sensor 120 at the left terminal end 126. The voltage sensor 120 and the current and voltage sensor 110 are both insulators, which prevent electricity from flowing across the terminal ends 124 and 126 via the phase base cross bar 116. The left terminal 130 is clamped to the vacuum break switch 100 approximately at the bottom of the voltage sensor 120 via a left terminal pad 134, and the right terminal 128 is clamped at the right terminal pad 133 near the bottom of the current and voltage sensor 110 via a right sensor clamp 132.

Figure 1C:
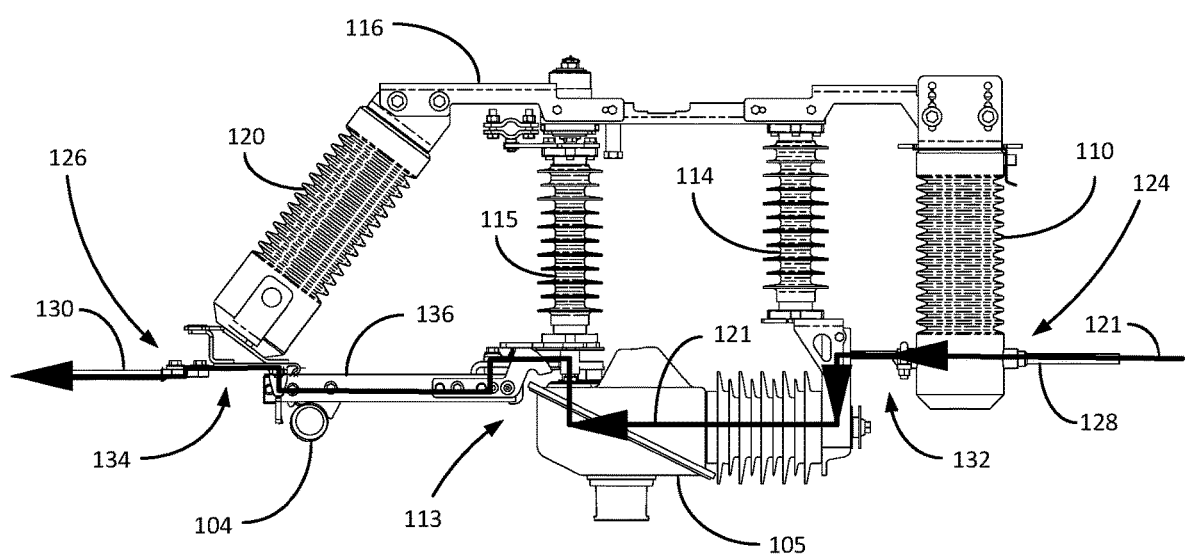

As shown in FIG. 1C, the electrically 'hot' (i.e., electrified) portion, or arm, of the underarm vacuum break switch arrangement 100 is a powerline pathway 121, which is the only electrical pathway through the underarm vacuum break switch arrangement 100. The powerline pathway 121 includes the left terminal 130, the left terminal pad 134, the disconnect blade 136, the vacuum switch 105, the right sensor clamp 132, and the right terminal 128. Accordingly, the upper portion of the underarm vacuum break switch arrangement 100, which includes the current and voltage sensor 110, the phase base cross bar 116, the voltage sensor 120, and the two post insulators 114 and 115 are not electrically 'hot'. The underarm vacuum break switch arrangement 100 (where the electrified arm portion is hanging under the upper portion) is considerably safer for birds that perch on the underarm vacuum break switch arrangement 100 because there is essentially no chance of the birds, or animals, being electrocuted.

Figure 1D:
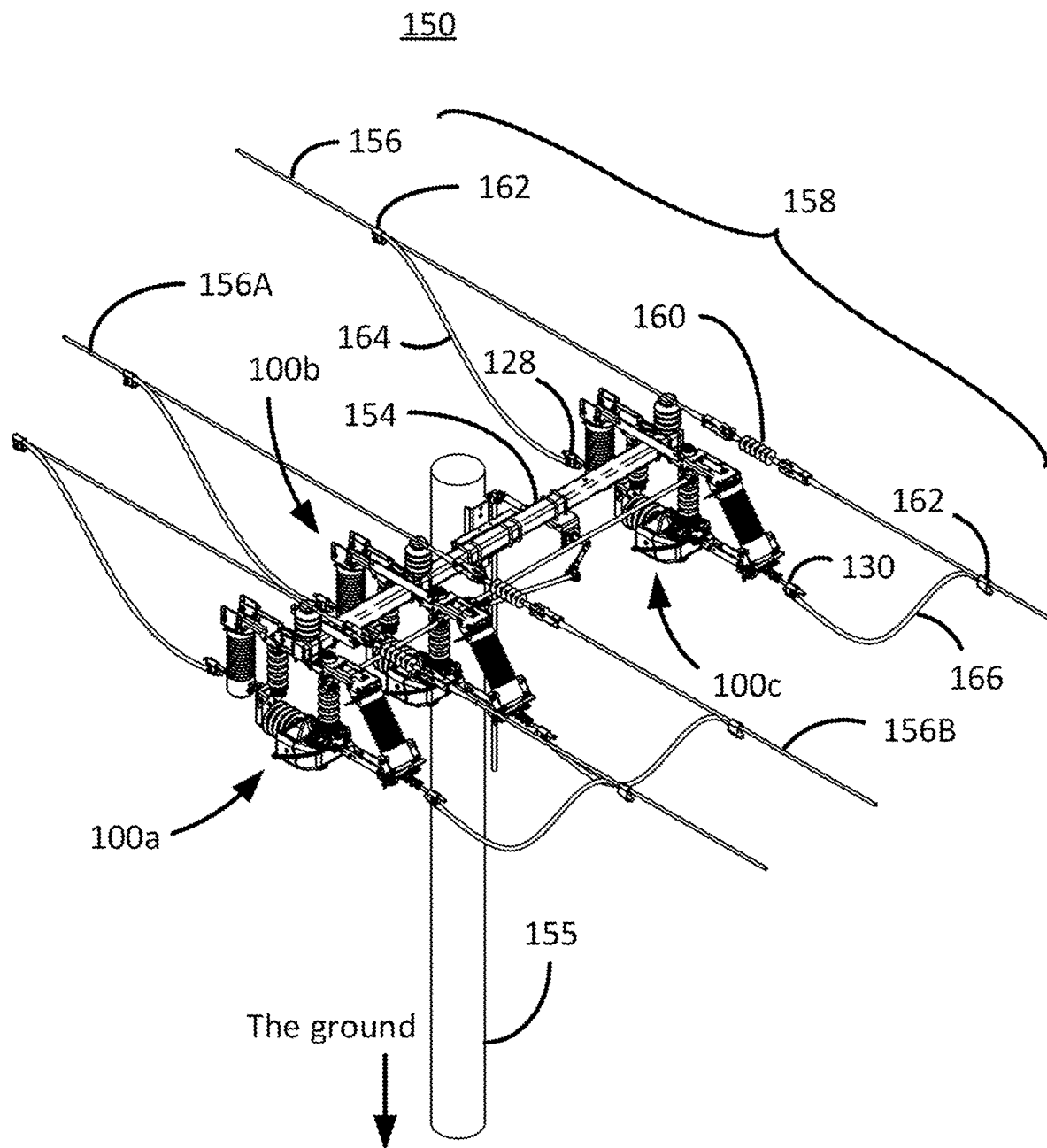
FIG. 1D is a line drawing of a commercial embodiment that illustratively depicts a three-phase underarm switch system consistent with embodiments of the present invention.

The phase base cross bar 116 comprises a cross arm recess 122 that accommodates a cross arm 152, which can supports additional underarm vacuum break switch arrangements 100. FIG. 1D is a line drawing of a commercial embodiment of a three-phase underarm switch system 150, wherein three underarm vacuum break switches 100a, 100b and 100c are mounted to a cross arm 152 atop a telephone pole 155. The power line 156 is electrically broken at a powerline bypass 158 via a powerline insulator 160 that prevents electrical current from flowing between the powerline bypass junctions 162. The powerline insulator 160 keeps the powerline 156 in tension but without continuity between the first powerline side 156A and the second powerline side 156B. A first powerline bypass 164 connects to the right terminal 128 and a second powerline bypass 166 connects to the left terminal 130, which enables power to flow through the underarm powerline pathway 121 of the corresponding underarm vacuum break switch arrangement 100.

The underarm vacuum break switch arrangement 100 is also sometimes considered a sectionalizer because if the high voltage powerlines 156 are somehow disrupted or damaged upstream (e.g., a tree falls on a section of powerline or there is some other kind of fault that trips a recloser circuit breaker) the voltage sensor 120 and the current and voltage sensor 110 senses a spike in current from a fault, then a drop in voltage, which sends a message to the vacuum switch motor that, in turn, rotates the spindle 118 to turn the vacuum switch 105 to open. This action contains the powerline disruption. The vacuum switch 105 can be opened via the rotating spindle 118 that is turned counterclockwise via a control box with the vacuum switch motor and linkage (not shown) that is attached nearby on the telephone/utility pole 155. In this way, power can be rerouted from another direction to restore power to customers quickly.

Figure 2A:
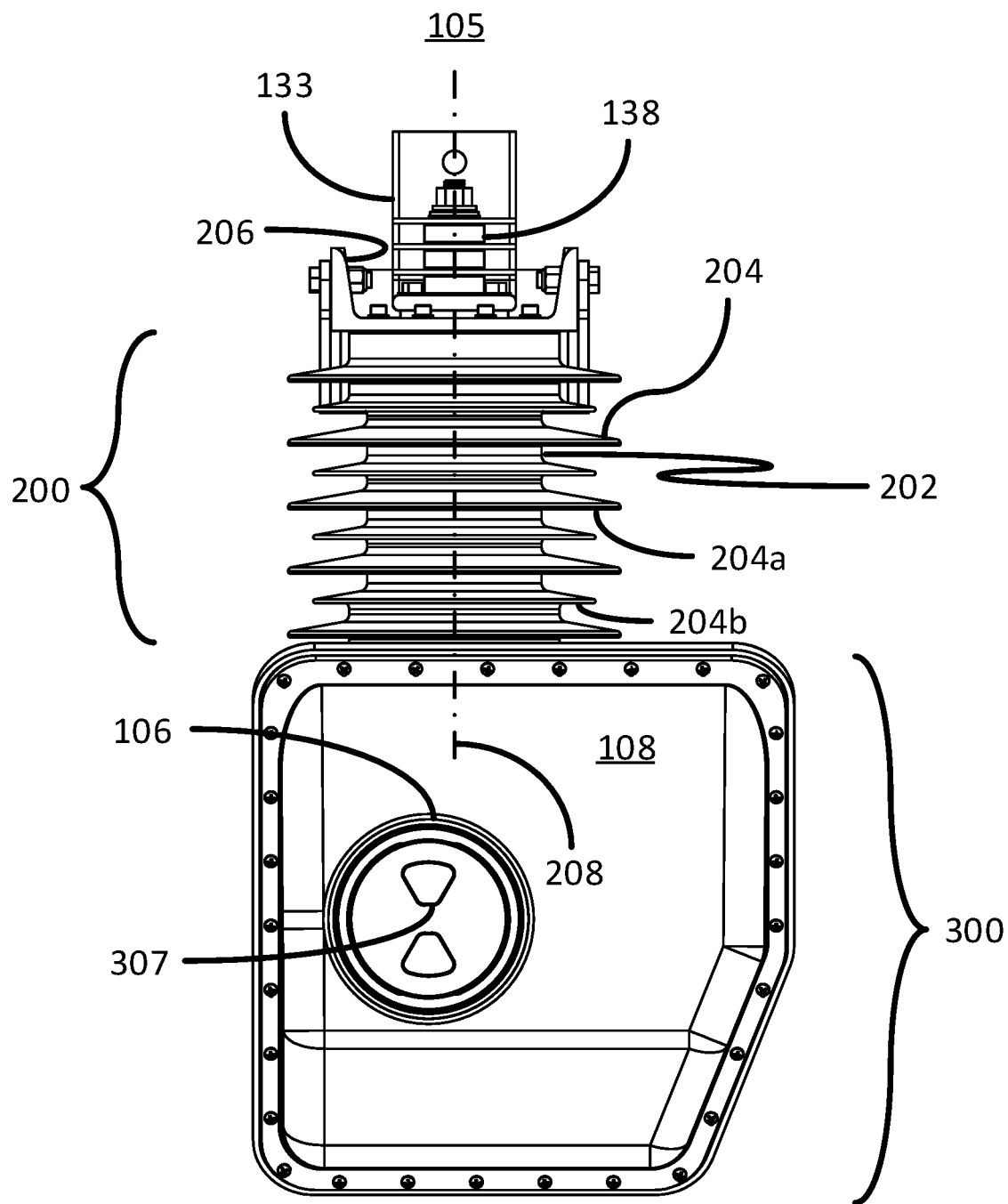
FIG. 2A is a line drawing of a bottom view of the vacuum switch consistent with embodiments of the present invention.

With more detail to the vacuum switch 105, FIG. 2A is a line drawing of a bottom view of the vacuum switch 105 consistent with embodiments of the present invention. The two main portions of the vacuum switch 105 are a vacuum bottle assembly 200 and an actuator mechanism 300 that drives an electrical on/off switch inside of the vacuum bottle assembly 200. The vacuum bottle switch assembly 200 generally includes a vacuum bottle 220 and switch system 210 and 212 (shown in FIGS. 3A and 3B) that are inside of a vacuum bottle silicone overmold 202. The vacuum bottle silicone overmold 202 includes a plurality of circular silicone ice and water sheds 204 (concentric about a vacuum bottle assembly axis 208), that shed water (i.e., they prevent a water bead from forming) thereby preventing ice from forming on the vacuum bottle silicone overmold 202. The silicone material also discourages water from accumulating and freezing in a harmful way around the vacuum bottle silicone housing 200. The vacuum bottle silicone overmold 202 additionally functions as an insulator. In the present embodiment, the circular sheds 204 alternate between larger diameter sheds 204a and smaller diameter sheds 204b. Certain embodiments envision the sheds 204 being a continuous/singular silicone mold that includes the vacuum bottle silicone overmold 202. A conductive heatsink 138 extends from a static contact arm 210 (of FIGS. 3A and 3B) within the vacuum bottle 220 that connects to a conductive right terminal pad 133, which is part of the right sensor clamp 132. In certain embodiments, the conductive heatsink 138 and the conductive right terminal pad 133 are copper. The conductive heatsink 138 that dissipates excessive heat produced by the vacuum bottle 220. The conductive heatsink 138 is somewhat protected by an aluminum mounting channel 206.

Figure 2B:
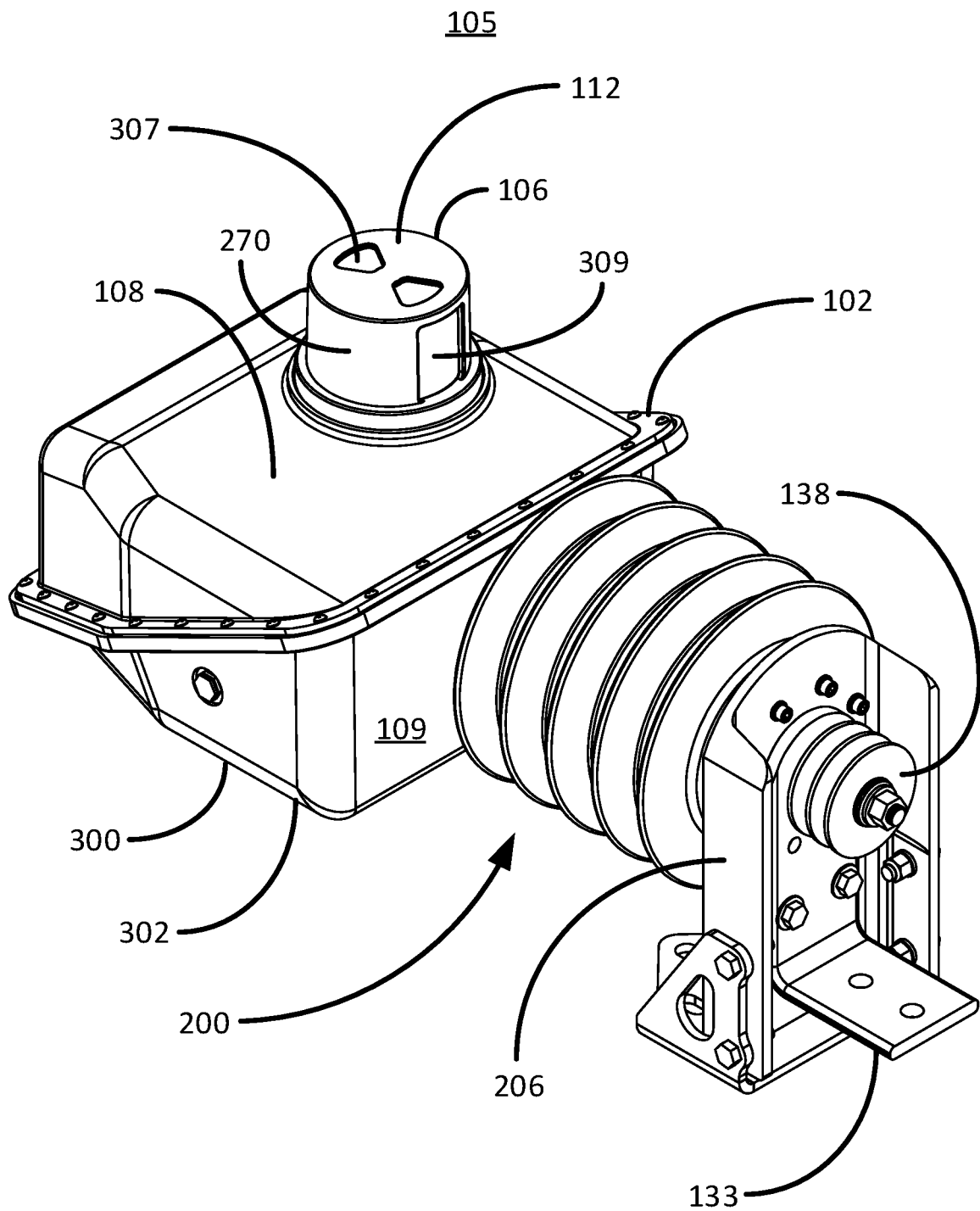
FIG. 2B is an isometric line drawing of the vacuum switch with the actuator mechanism down facing cover inverted.

FIG. 2B is an isometric line drawing of the vacuum switch 105 with the actuator mechanism down facing cover 108 inverted (pointing upward). With reference to the actuator mechanism 300, the open/close indicator 106 is extending upward and displays a bottom view visual indicator 307 on the open/close indicator ground facing surface 112, which when installed on a utility pole 155 with overhead powerlines 156, can easily be read by an electrician viewing the vacuum switch 105 from below. There are additional side view visual indicators 309, that are located on either side of the indicator side surface 270 of the open/close indicator 106. In one embodiment, the visual indicators 307 and 309 are colored red to indicate that the vacuum switch 105 is 'electrically live' (i.e., closed switch) and green to indicate that the vacuum switch 105 is 'electrically dead' (i.e., open switch). The actuator mechanism 300 is encased in a poly carbonate actuator mechanism housing 302 that protects the inner actuator elements from outside weather. The actuator mechanism 300 drives or otherwise actuates the switch 212 inside of the vacuum bottle assembly 200. For reference, the right terminal pad 133, conductive heatsink 138, and the aluminum mounting channel 206 are shown. The actuator mechanism down facing cover 108 is attached to the actuator mechanism up facing cover 109 via a plurality of bolts in an actuator mechanism cover flange 102.

Figure 2C:
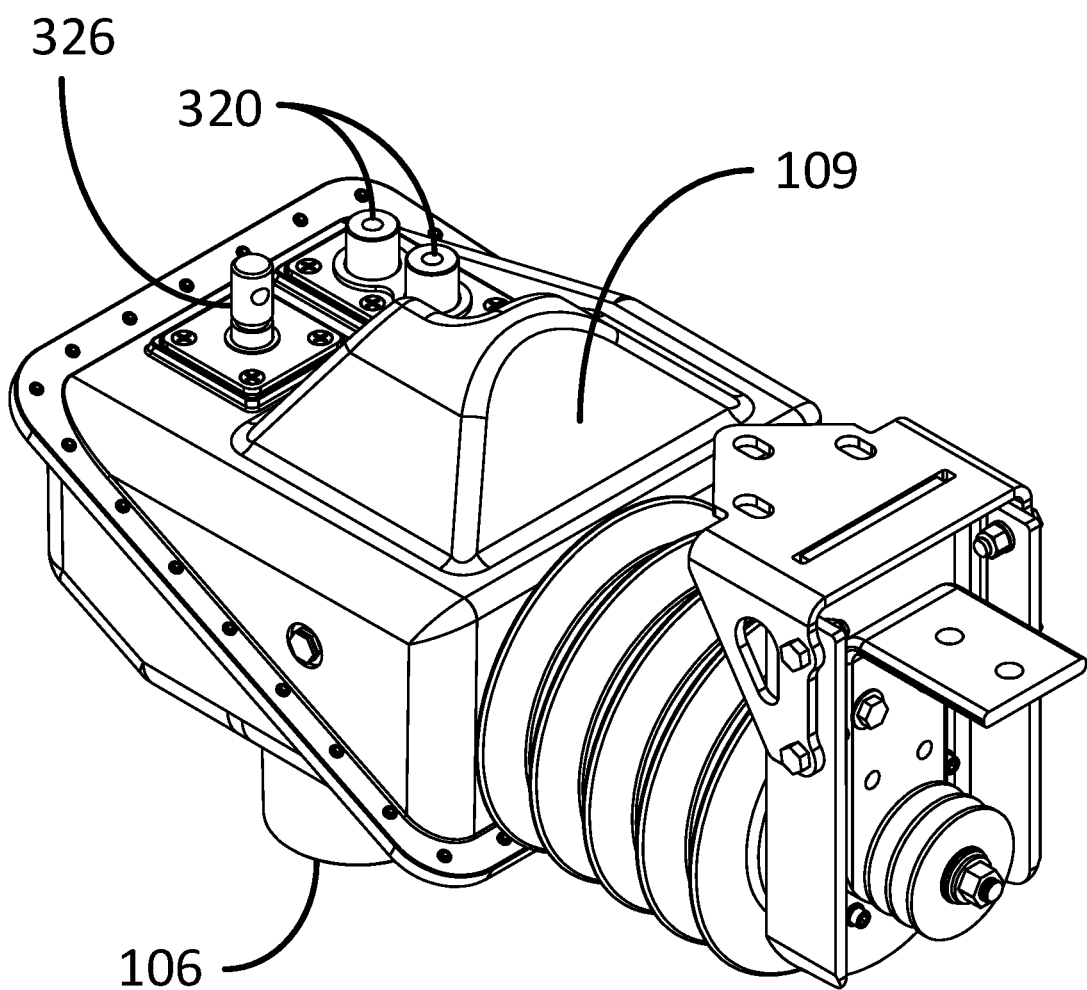
FIG. 2C is an isometric line drawing showing the vacuum switch with the actuator mechanism down facing cover pointing downward with the open/close indicator facing the ground.
Figure 2D:
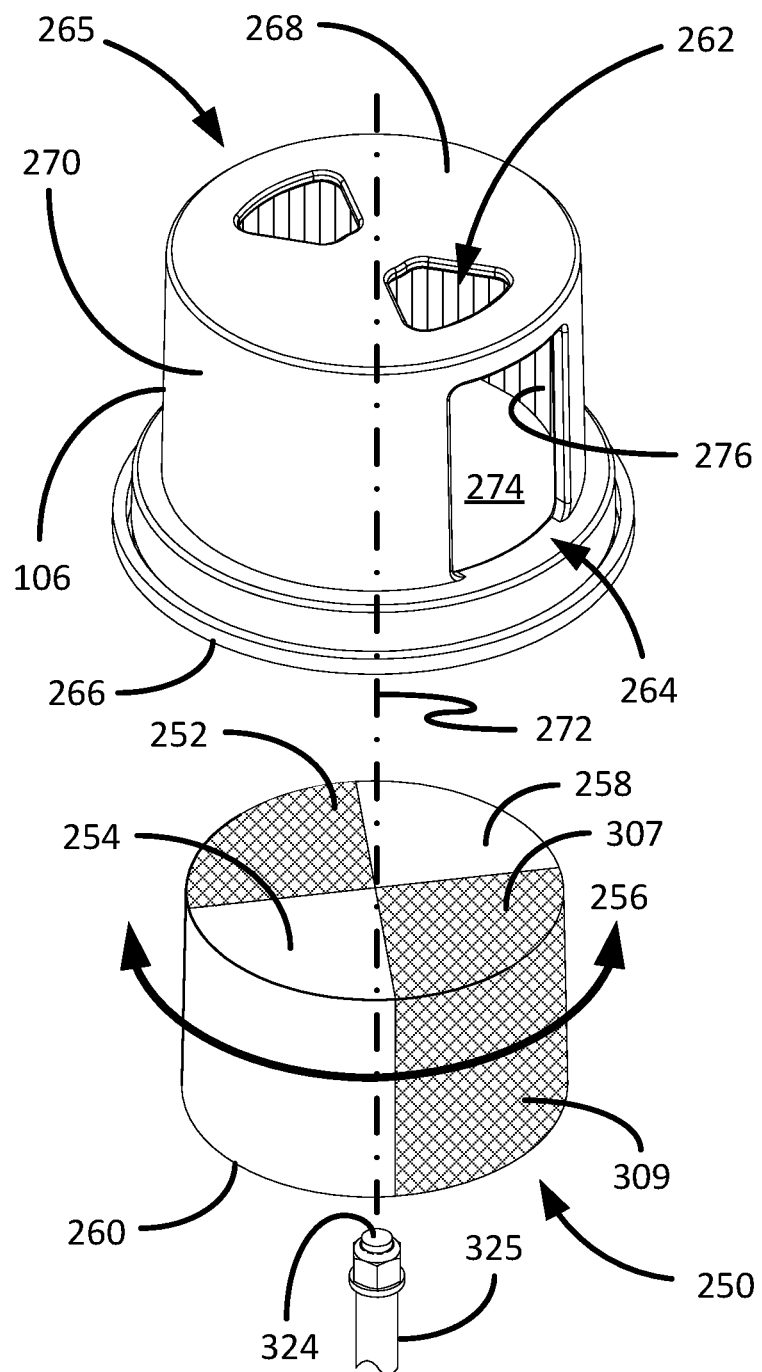
FIG. 2D is a line drawing of an exploded view of the open/close indicator consistent with embodiments of the present invention.

FIG. 2C is an isometric line drawing showing the vacuum switch 105 with the actuator mechanism down facing cover 108 pointing downward with the open/close indicator 106 facing the ground, which is the same orientation when installed on a utility pole 155. An open/close pivot shaft 326 is depicted extending from the actuator mechanism up facing cover 109. The open/close pivot shaft 326 is physically rotated to open or close the vacuum switch 105 and is configured to be attached to the rotating spindle 118 that is in the rotating spindle insulator. Next to the open/close pivot shaft 326 are two electrical contact posts 320 that connect to the disconnect blade 136 (shown in FIG. 1A) via a disconnect blade busbar 140. When the vacuum switch 105 is closed and the rest of the circuit is closed (thereby connecting the powerlines 156A and 156B), electricity flows from the right terminal pad 133 through the two electrical contact posts 320 and through the left terminal 130. FIG. 2D is a line drawing of an exploded view of the open/close indicator 106 consistent with embodiments of the present invention. Though there are several different ways to design an open/close indicator that cooperates with the open/close rotating shaft 325, the embodiment of FIG. 2D provides insight into the possibilities. This open/close indicator embodiment 106 generally comprises a cylindrically shaped inner hub/drum 250 that is axially connected (along the indicator axis 272) to the open/close indicator shaft distal end 324 of the open/close indicator shaft 325 at a connection location, which is not shown but is inside of the hub 250 accessible through an accommodating opening (not shown) in the hub proximal side 260. The hub proximal side 260 faces the actuator mechanism 300. The actuator hub 250 has side view visual indicators 309 that align with bottom view visual indicators 307, as shown. In one embodiment, there is a red panel 252 and a green panel 254 that are configured to appear through an indicator side surface window 264 and in an indicator distal surface window 262 of an indicator housing 265 when the hub 250 is inside of the indicator housing 265. Optional embodiments envision white and black or other colors. As should be appreciated, the hub 250 goes into the indicator housing 265 via an opening 274 in the indicator housing proximal side 266. When the hub 250 is inside of the indicator housing 265, the hub 250 can freely rotate therein without being obstructed by the inner housing surface 276. Accordingly, when installed, the indicator housing 265 can be attached or anchored to the actuator mechanism down facing cover 108 and the hub 250 can rotate with the open/close indicator shaft 325 either clockwise or counterclockwise 256 within the indicator housing 265. As the actuator mechanism 300 closes the switch 210 and 212, the open/close indicator shaft 325 rotates thereby rotating the hub 250 in a first position with the red panel 252 being displayed through the indicator side surface windows 264 and the indicator distal surface windows 262. When the actuator mechanism 300 opens the switch 210 and 212, the open/close indicator shaft 325 rotates in the other direction (in a second position) thereby rotating the hub 250 with the green panel 254 being displayed through the indicator side surface windows 264 and the indicator distal surface windows 262.

Figure 3A:
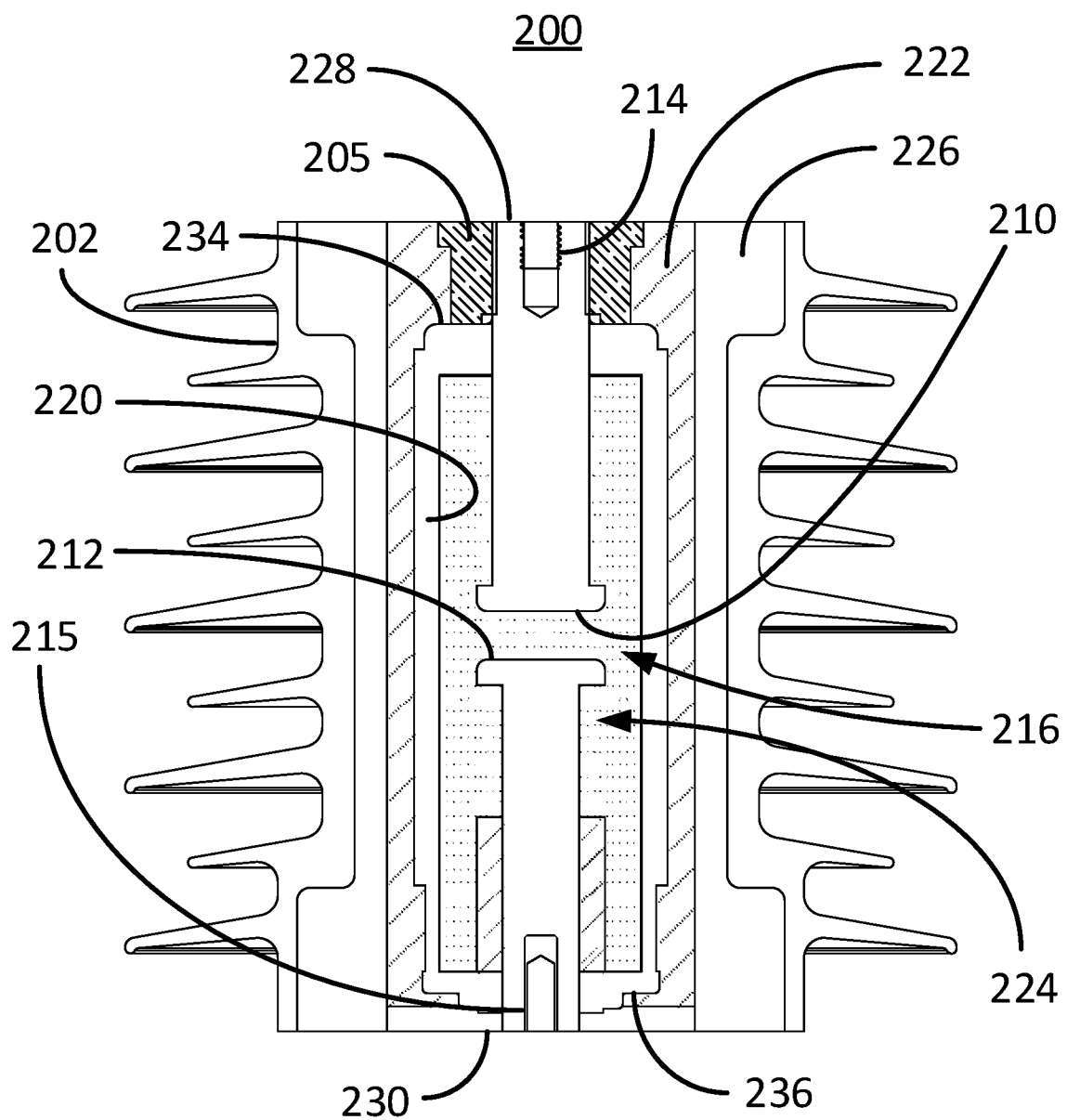
FIGS. 3A and 3B are line drawings of a cross-section of the vacuum bottle assembly consistent with embodiments of the present invention.
Figure 3B:
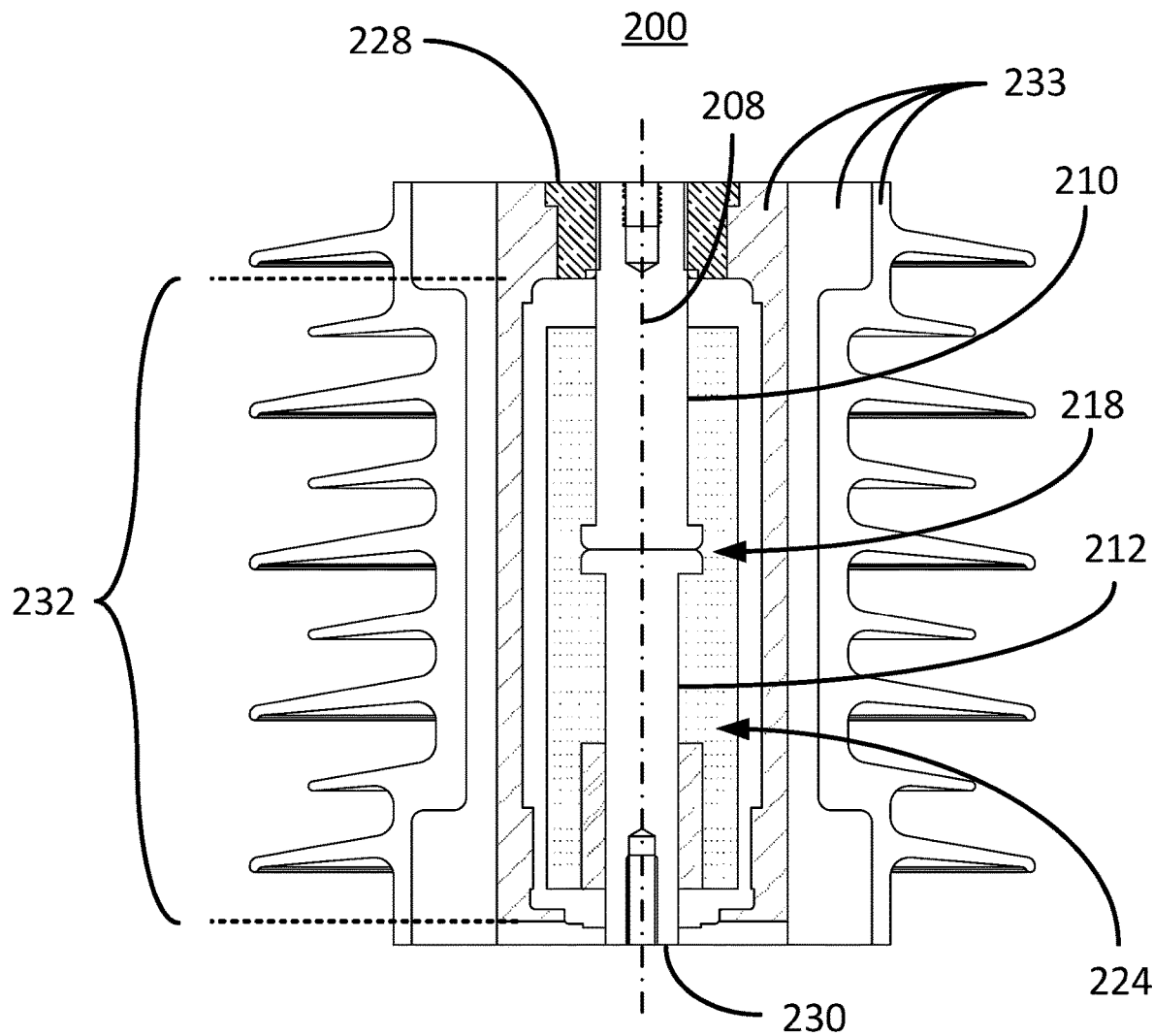

FIGS. 3A and 3B are line drawings of a cross-section of the vacuum bottle assembly 200 consistent with embodiments of the present invention. FIG. 3A depicts a cross-section of the vacuum bottle assembly 200 when the switch is open (open circuit) and FIG. 3B depicts the cross-section of the vacuum bottle assembly 200 when the switch is closed (closed circuit). With reference to FIG. 3A, shown therein is the vacuum switch 200 that is in an open configuration with a fixed electrical contact 210 separated from a dynamic electrical contact 212, as shown by the contact gap 216. The fixed and movable/dynamic contacts 210 and 212, respectively, are contained in a vacuum (chamber) 224 that is defined inside of a porcelain ceramic vacuum bottle 220. The vacuum 224 has a dielectric constant that is significantly lower than air thus functioning as a superior medium to lower sparking from the electrical contacts 210 and 212. The vacuum bottle 220 is essentially encased in a urethane insulator 222 that provides insulation and protection to the vacuum bottle 120. Historically, vacuum bottles have been encased by and insulated with SF-6 gas, now being replaced with nitrogen gas due to SF-6 gas negatively impacting the environment. The urethane insulator 222 is essentially surrounded by a fiberglass tube 226 that provides structural integrity to the porcelain ceramic vacuum bottle 220. The vacuum bottle silicone overmold 202 further provides dielectric insulation that helps prevent electricity from arcing between the fixed contact end 228 and the dynamic contact end 230. The vacuum 224, the vacuum bottle 220, the urethane insulator 222, the fiberglass tube 226 and the vacuum bottle silicone overmold 202 all function to isolate electricity to passing only between the fixed contact end 228 and the dynamic contact end 230 via the fixed electrical contact 210 and the dynamic electrical contact 212.

As further shown, the fixed electrical contact 210 is anchored to a fixed contact lead screw 214 and the dynamic electrical contact 212 is anchored to a dynamic contact lead screw 215. The fixed contact lead screw 214 and the dynamic contact lead screw 215 allows for modular assembly of the vacuum switch 105 and further provides using an off-the-shelf vacuum bottle that has receiving threaded screw holes. This arrangement also facilitates replacing the vacuum bottle 200 if it fails. FIG. 3B depicts the contacts 210 and 212 touching, which forms electrical contact thus closing the circuit and permitting electricity to flow between the fixed contact end 228 and the dynamic contact end 230, as shown by the closed gap 218.

Figure 4A:
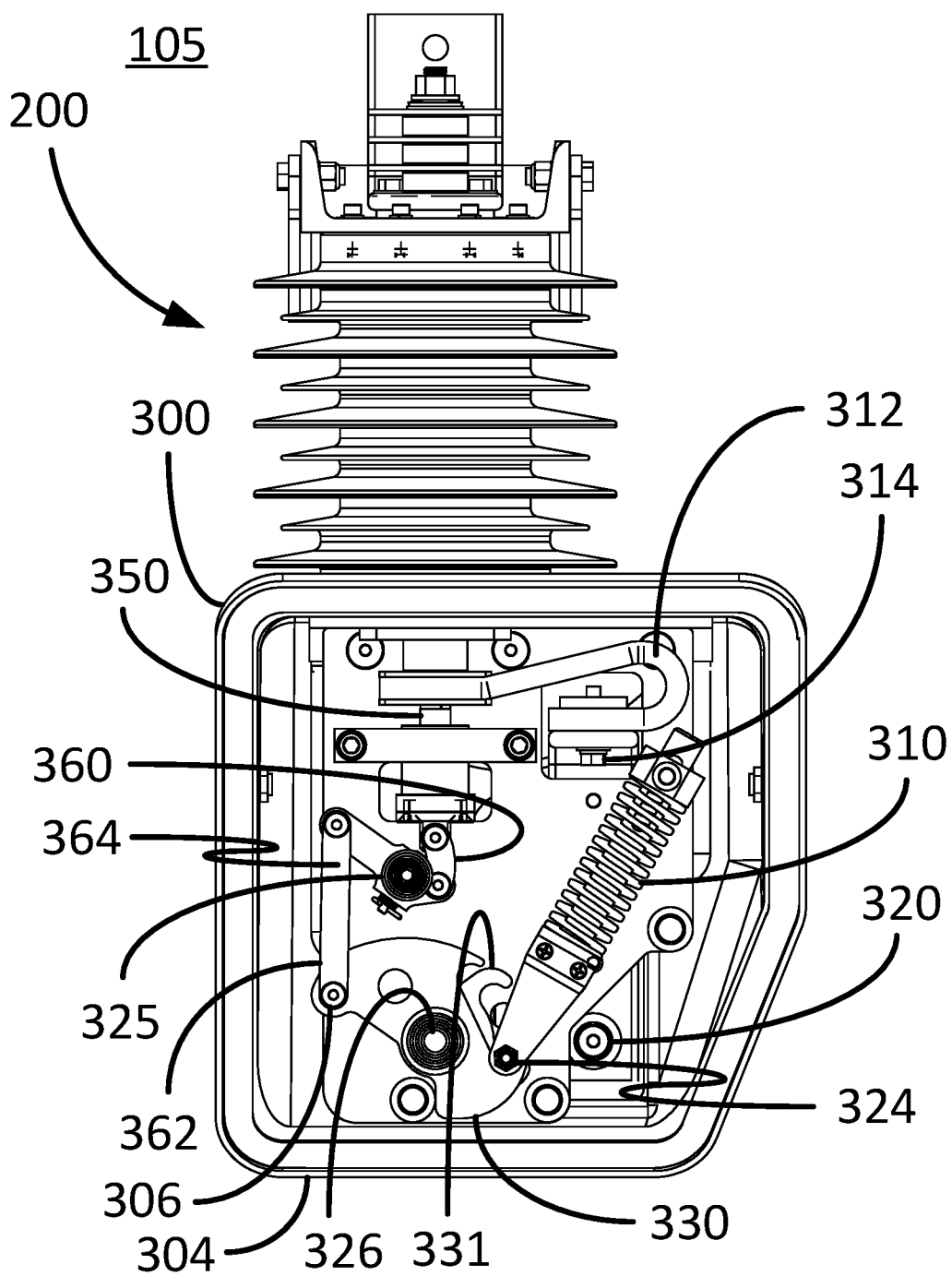
FIGS. 4A-4C are line drawings that illustratively depict internal components of the vacuum switch embodiment consistent with embodiments of the present invention.
Figure 4B:
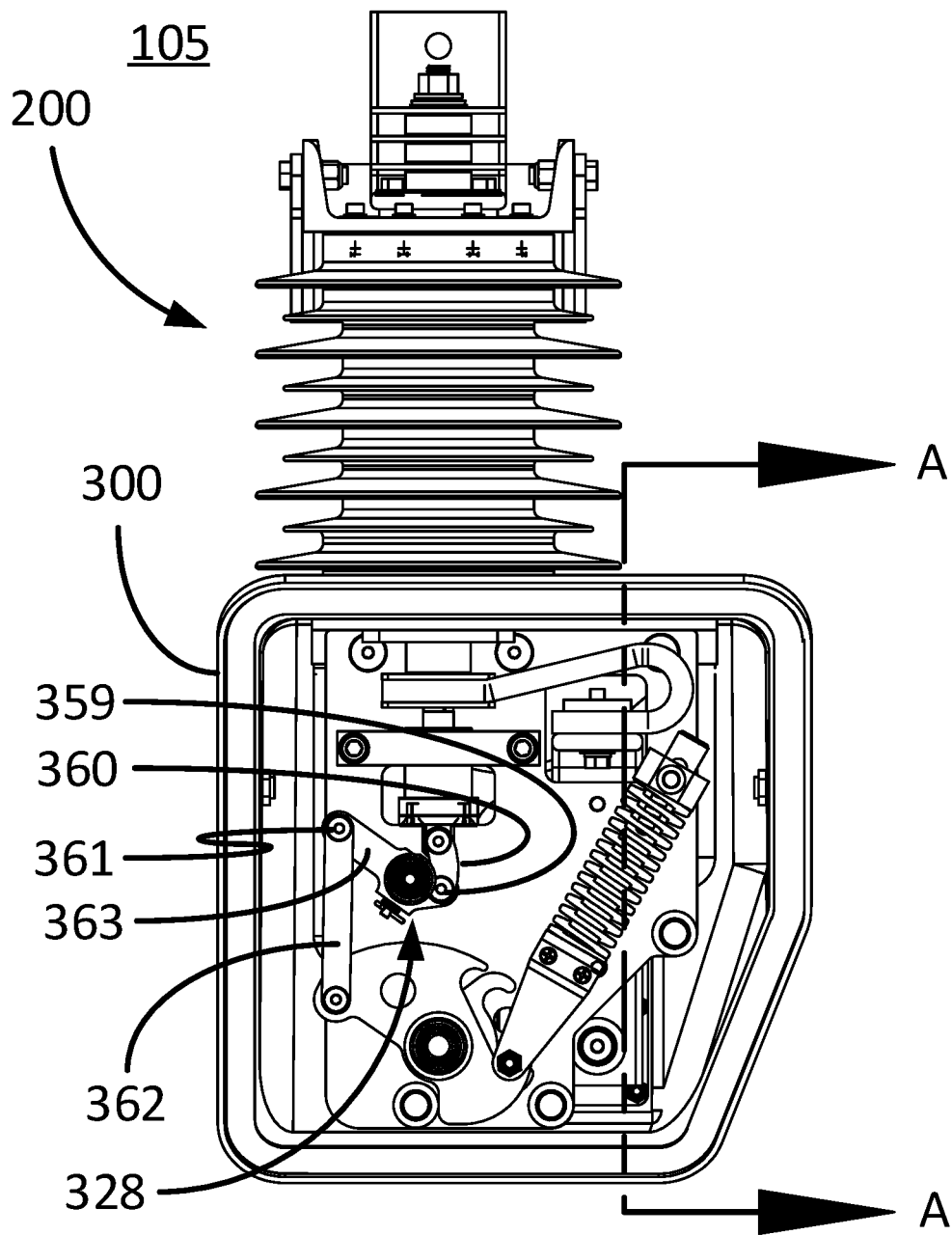
Figure 4C:
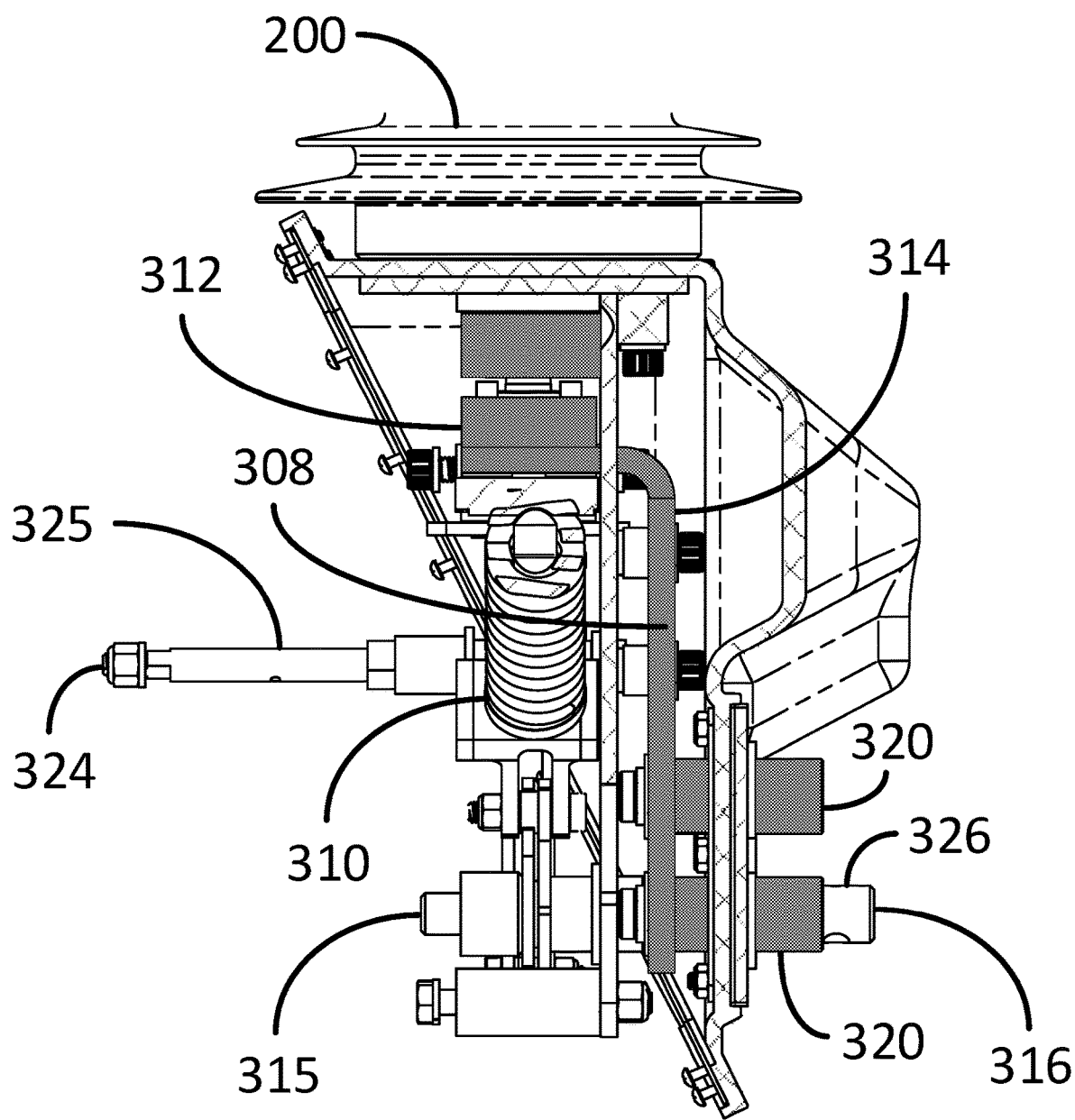

FIGS. 4A-4C are line drawings that illustratively depict internal components of the vacuum switch embodiment 105 consistent with embodiments of the present invention. FIG. 4A is a bottom view of the vacuum switch 105 depicting the vacuum bottle assembly 200 and the actuator mechanism between the two section plates 370A and 370B of FIG. 6C in the down facing direction of the actuator mechanism 300. When the vacuum switch 105 is closed, electricity flows from the contacts 210 and 212 through the flexible busbar 312, along an internal electrical bar 314 and out from the actuator mechanism 300 via the two electrical contact posts 320. The flexible busbar 312 is a copper laminate comprised of a plurality of thin copper ribbon that moves with the dynamic contact lead screw 215 and dynamic electrical contact 212 as shown in FIGS. 5B and 5C. Electricity ultimately moves to the other end of the actuator mechanism 300 via an electrical contact post 320. The inner end of the electrical contact post 320 is shown here.

With respect to the moving parts of the actuator mechanism 300, the open/close pivot shaft 326 rotates either clockwise or counterclockwise axially as driven by the rotating spindle insulator 115. During its rotation, the plate hooks, for example the drive plate hook on the drive plate 331 of the open/close pivot shaft 326 engage the driving plate spring 310 and toggle the spring from a fully open to fully closed position, or vise versa about the pivot point connector 324. As the driving plate spring 310 is toggled over center in compression, the spring releases compression and rotates the linkage plate 330 to open (clockwise) or close (counterclockwise) the open/close circuit linkage 364. Accordingly, as the linkage plate 330 rotates clockwise, the lead linkage arm 362 that is attached to the linkage plate 330 at pivot point 306 goes up pulling the contact linkage 360 down via the pivot point 328 (see FIG. 4B) at the open/close indicator shaft 325. In this way, the dynamic contact lead screw 215 opens or otherwise separates the dynamic electrical contact 212 from the static electrical contact 210 causing the vacuum switch 105 to be in an 'open' state. The motion of the linkage plate 330 is toggled by the driving plate spring 310, which is attached to the linkage plate 330 via pivot point connector 324.

FIG. 4C is a cross-section of the actuator mechanism 300 along cutline A-A of FIG. 4B showing the internal electrical pathway 308 depicted in the highly pixelated elements. Except for the labels to more cleanly show cutline A-A, FIG. 4B is identical to FIG. 4A. As shown in FIG. 4C, the actuator mechanism's internal electrical pathway 308 includes the dynamic electrical contact 312 that is connected to the internal electrical busbar 314 that is connected to the two electrical contact posts 320. For reference, a portion of the vacuum bottle assembly 200 is shown along with the driving plate spring 310 as well as the open/close indicator shaft 325 extending to the left. Also, for reference, the open/close pivot shaft 326 is shown extending to the right, which connects to the spindle 118. The other end 315 of the open/close pivot shaft 326 connects to a rotating mass 375 discussed in connection with FIGS. 6A-6C.

Figure 5A:
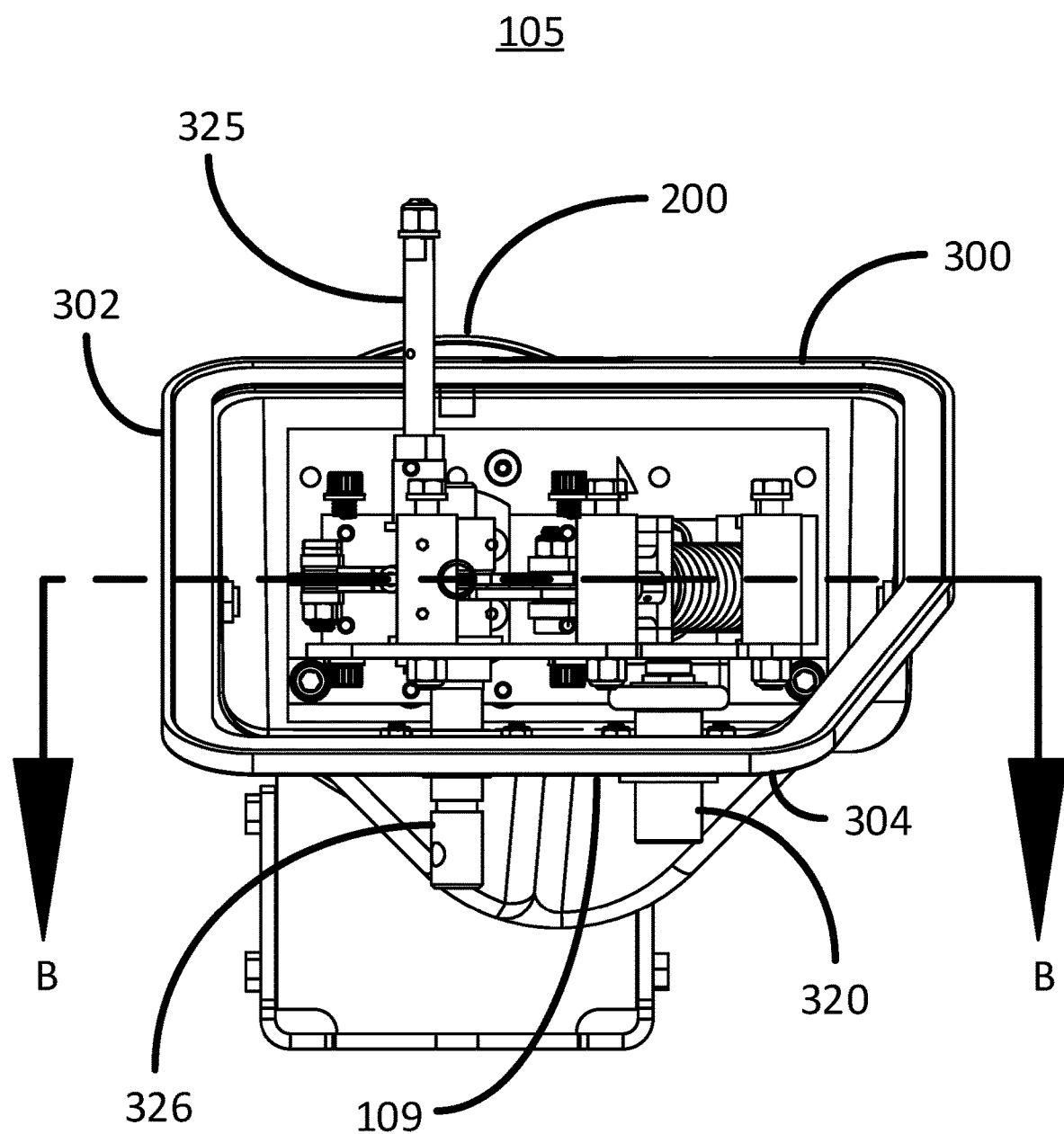
FIGS. 5A-5C are line drawings that illustratively depict cross-sectional views of the vacuum switch consistent with embodiments of the present invention.
Figure 5B:
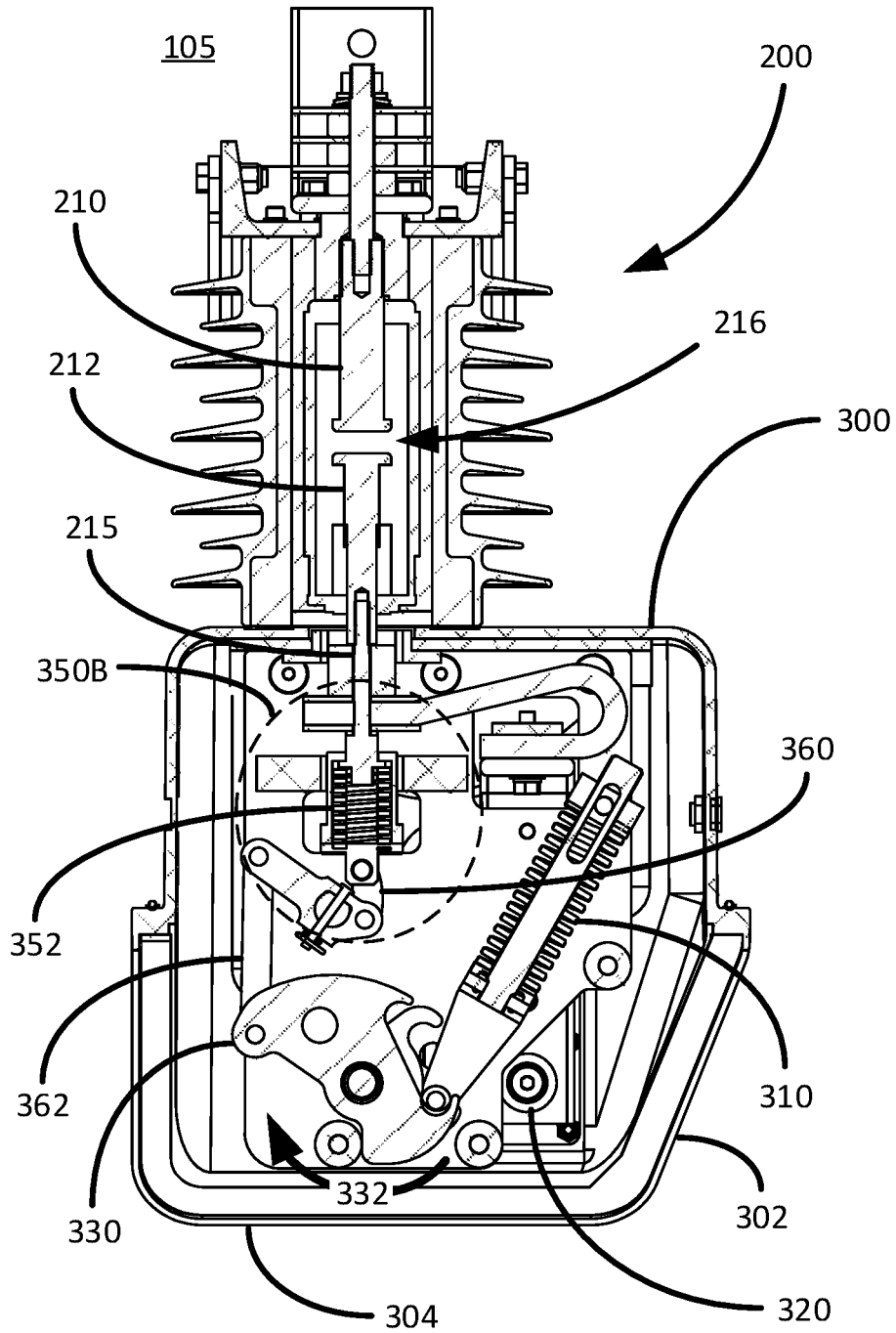
Figure 5C:
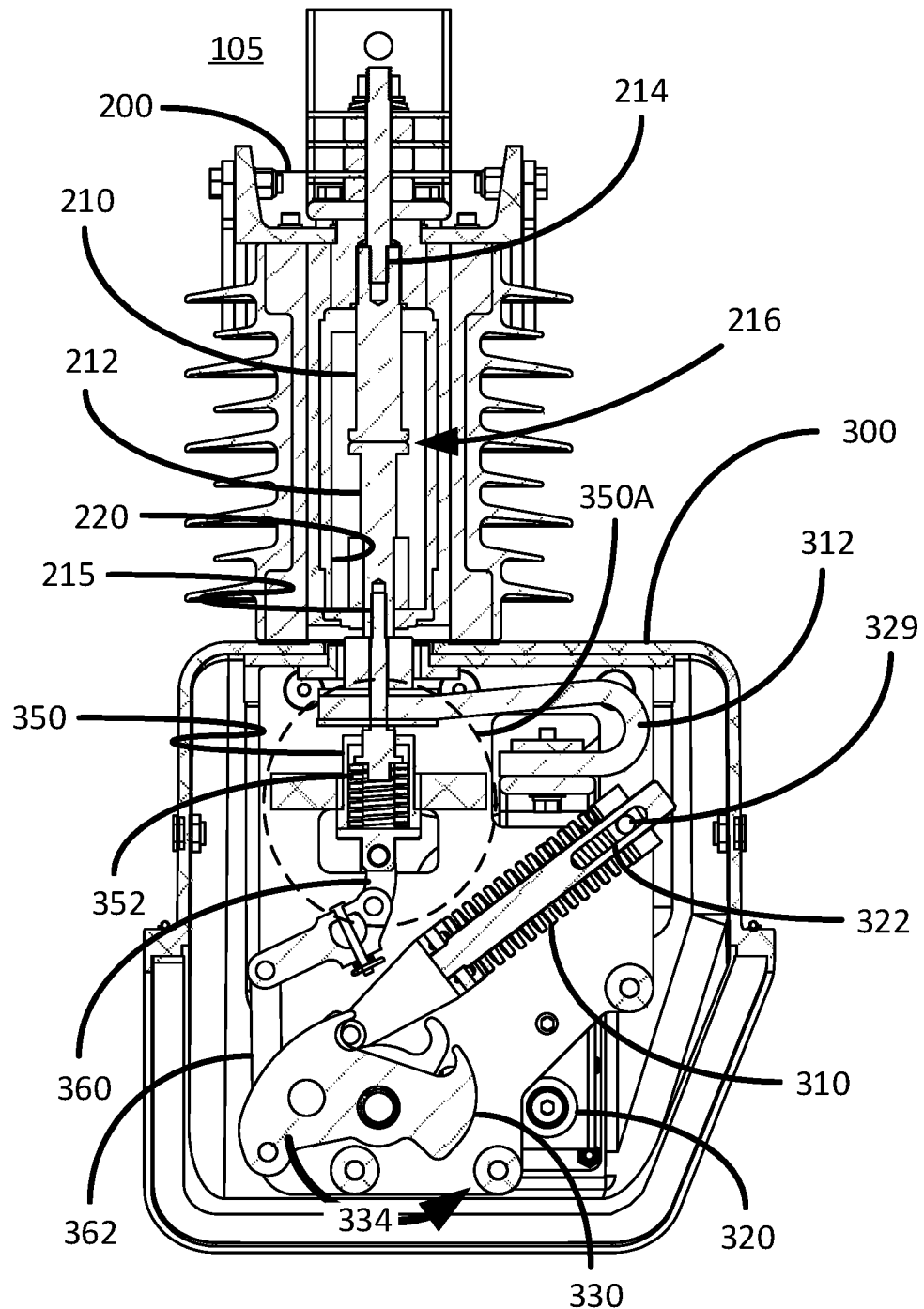

FIGS. 5A-5C are line drawings that illustratively depict cross-sectional views of the vacuum switch 105 consistent with embodiments of the present invention. FIG. 5A is a bottom view of the vacuum switch 105 with the actuator mechanism down facing cover 108, which is removed to provide a view of the inner elements of the actuator mechanism 300. A small portion of the vacuum bottle assembly 200 is shown approximately where the open/closed indicator shaft 325 extends outwardly from the polycarbonate actuator mechanism housing 302. The vacuum switch 105 is bisected along cutline B-B. This perspective shows the open/close pivot shaft 326 and one of the electrical contact posts 320 extending from the actuator mechanism up facing cover 109.

FIG. 5B illustratively depicts the cross-section view of the vacuum switch 105 along cutline B-B in an open circuit configuration. Like the configuration of FIG. 4A, the linkage plate 330 is rotated clockwise thereby pulling the dynamic contact lead screw 215 and dynamic electrical contact 212 downward in an open position, which halts the flow of energy from the fixed electrical contact 210 to the electrical contact posts 320. As mentioned earlier, this is accomplished by rotating the insulator spindle 118 by way of manual manipulation or a vacuum switch motor (not shown), which rotates the open/close pivot shaft 326 in the curved arrow direction 232, as shown. The cross-section helps show that when the contact linkage 360 is pulled down dynamic electrical contact 212 is pulled away from the fixed electrical contact 210 thereby creating the gap 216 that opens the vacuum switch 105 causing a break in the flow of electricity (assuming everything else is hooked up to the powerline 156). The shock absorber compression spring 352 is decompressed when the dynamic contact lead screw 215 is pulled down.

FIG. 5C illustratively depicts the cross-section view of the vacuum switch 105 along the cutline B-B in a closed-circuit configuration. Here, the linkage plate 330 is rotated counterclockwise as shown by arrow 334, which pulls the lead linkage arm 362 downwards thereby pushing the contact linkage 360 upwards to close the circuit 105. Closing the circuit snaps the fixed electrical contact 210 and the dynamic electrical contact 212 together 216. When the vacuum switch 105 is actuated in the closed orientation, the fixed electrical contact 210 and the dynamic electrical contact 212 tend to collide together with enough force to endanger breaking the contacts 210 and 212 or damaging other components within the vacuum bottle arrangement 200. Hence, the shock absorber compression spring 352 compresses to reduce the moving mass and kinetic energy of the mechanism linkage 364 and dynamic electrical contact 212 during the closing event. As shown, the driving plate spring 310 is rotated about pivot pin 329, which also can slide within a driving plate spring shaft slot 322. Accordingly, when the vacuum bottle contacts 210 and 212 are in contact 216, electricity can flow between the right terminal pad 133 and the electrical contact posts 320.

Figure 5D:
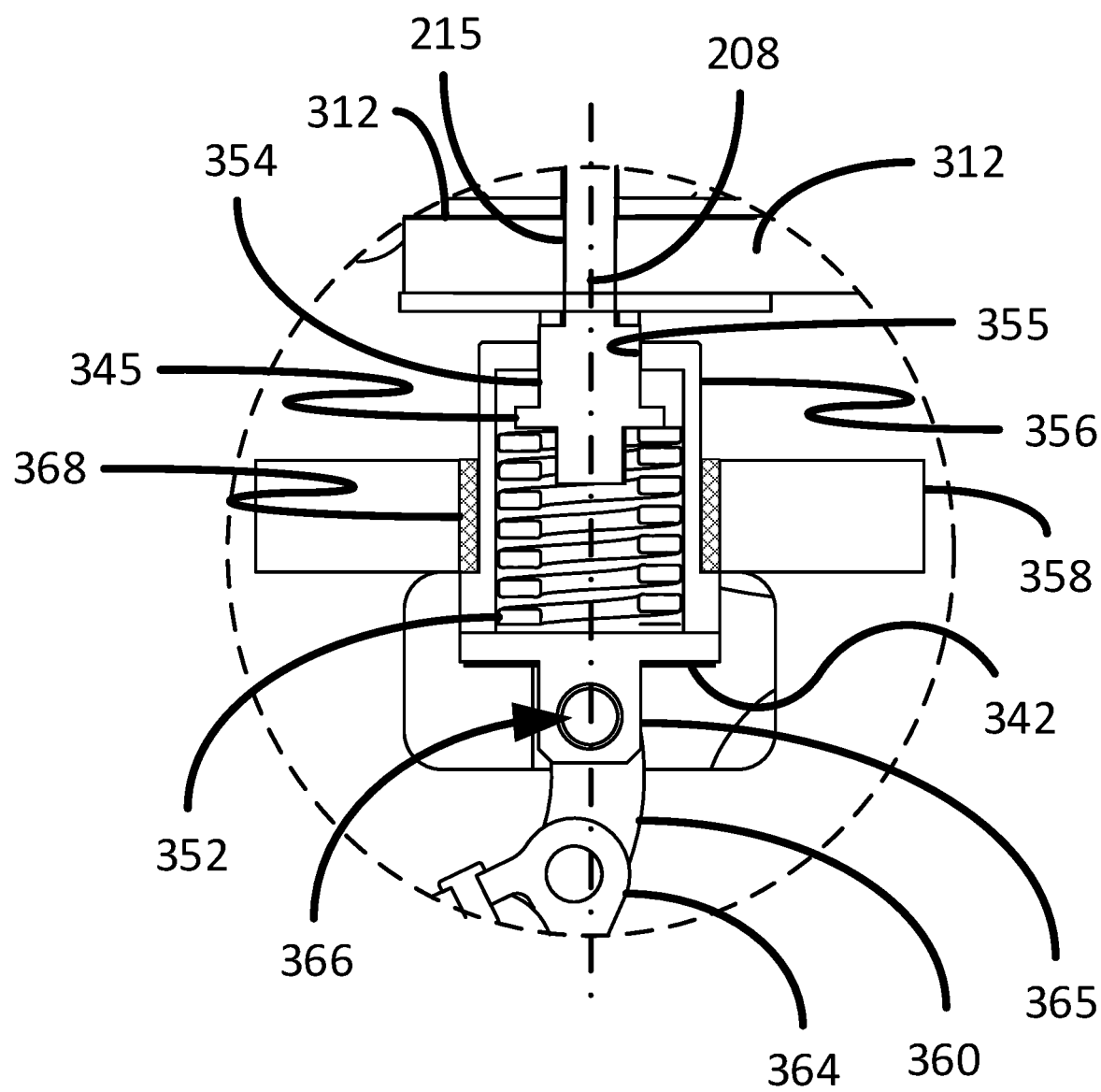
FIG. 5D is a line drawing illustratively depicting the shock absorber assembly with the vacuum switch in the closed position from FIG. 5C.

FIG. 5D is a line drawing illustratively depicting the shock absorber assembly 350 with the vacuum switch 105 in the closed position from FIG. 5C. As shown, the copper dynamic contact screw 115 that is integrated with or optionally a unitary element of the spring compression hub 354 compresses about one quarter of an inch from the open circuit orientation of FIG. 5B. The shock absorber compression spring 352 absorbs the shock from the mass of the moving elements within the actuator mechanism 300, which close the circuit (210 and 212) rapidly, thereby preventing damage to the contacts 310 and 312 when they shut. In other words, the shock absorber assembly 350 helps prevent damage to the contacts 210 and 212 from colliding together too hard. The shock absorber housing 356, which houses the compression spring 552 and part of the spring compression hub 354, is anchored down by way of an anchor strap 358. A housing lip 356 in the shock absorber housing 356 (called out in FIG. 5E) essentially contacts a bearing guide 368 in the anchor strap 358 when the shock absorber compression spring 352 is compressed.

Figure 5E:
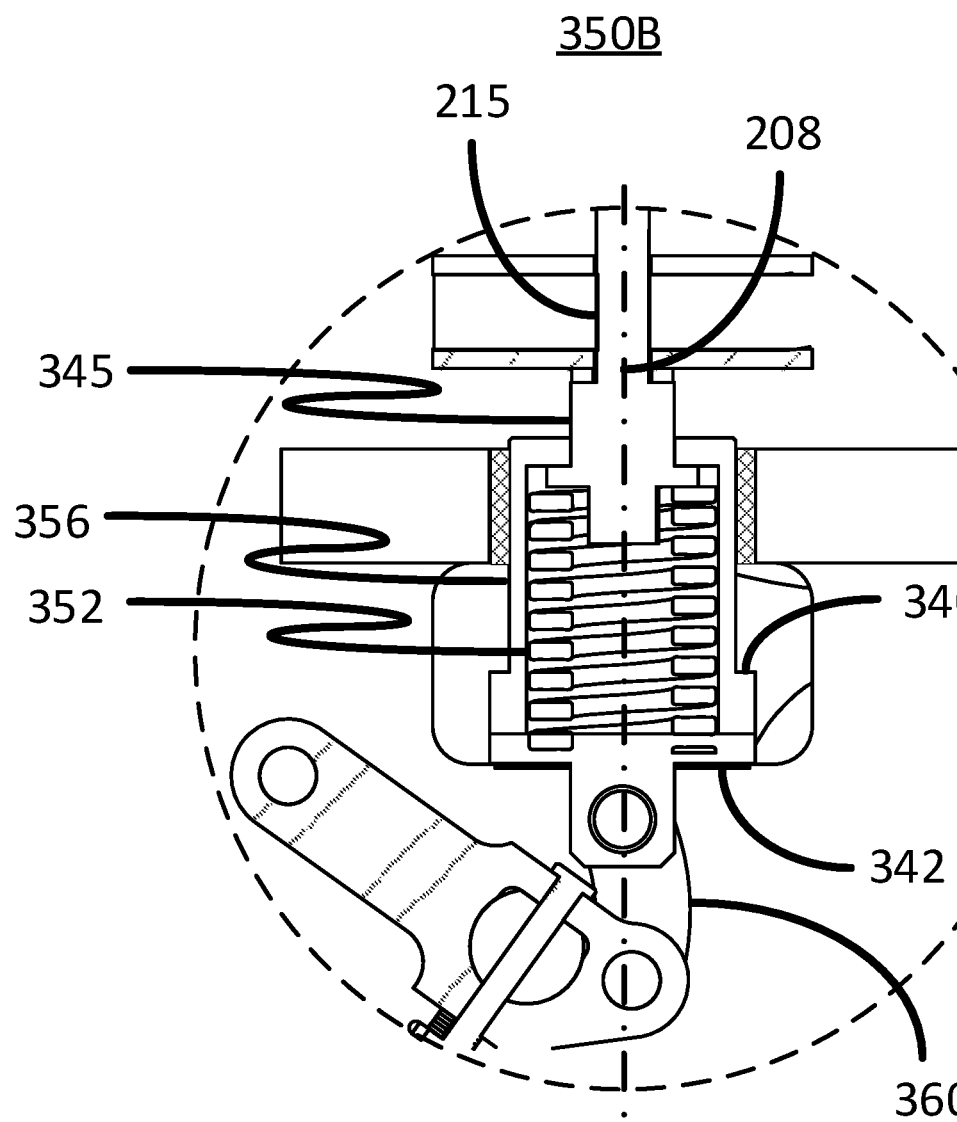
FIG. 5E is a line drawing illustratively depicting the shock absorber assembly with the vacuum switch in the open position from FIG. 5B.

FIG. 5E is a line drawing illustratively depicting the shock absorber assembly 350 with the vacuum switch 105 in the open position from FIG. 5B. As shown, the copper dynamic contact screw 115 is uncompressed about one quarter of an inch from the closed-circuit orientation of FIG. 5C. Likewise, the shock absorber housing 356 is pulled down along the axis 208 via the contact linkage 360.

Figure 6A:
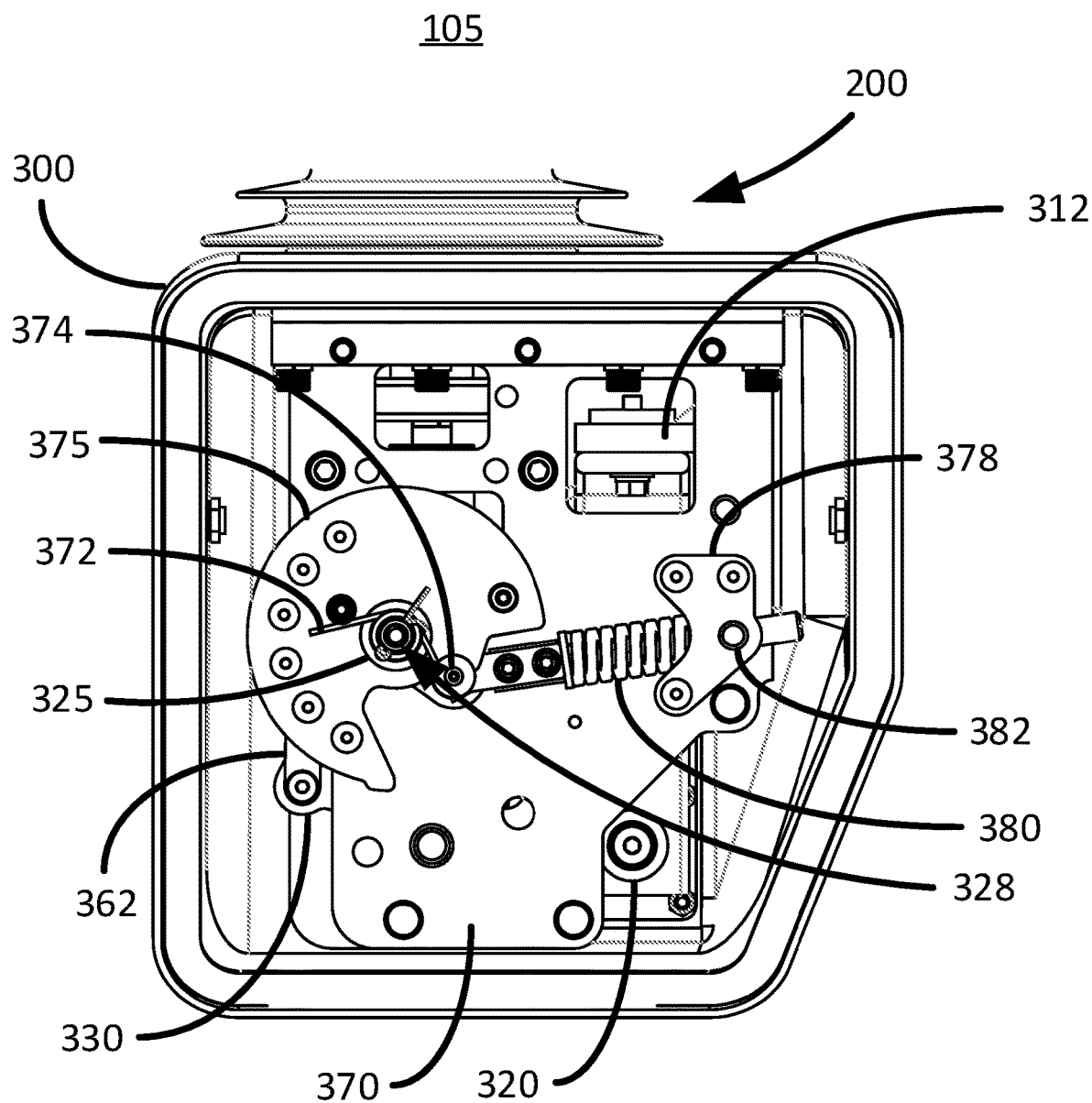
FIGS. 6A-6C are line drawings illustratively depicting a rotating mass configuration in the actuator mechanism.
Figure 6B:
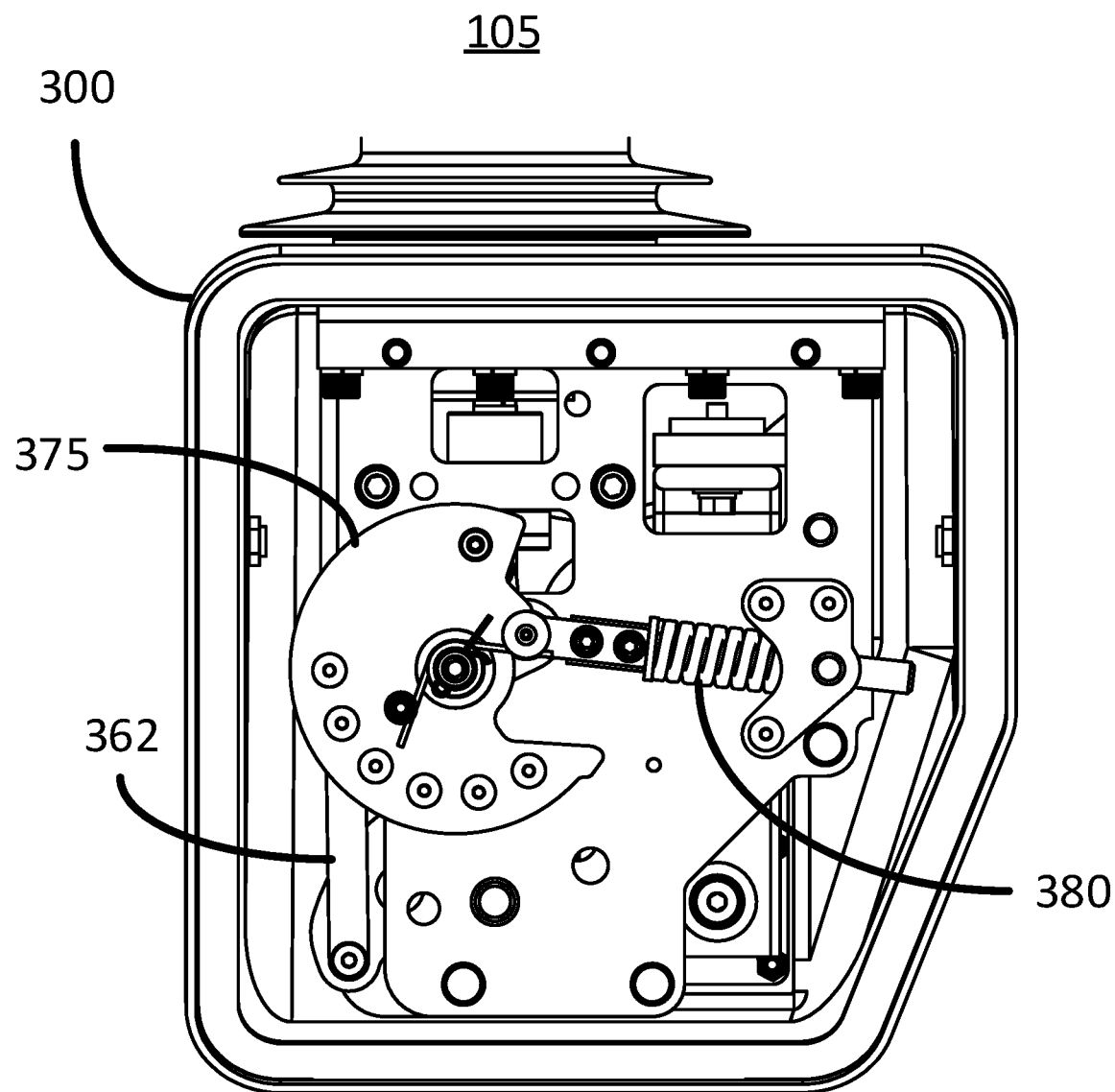
Figure 6C:
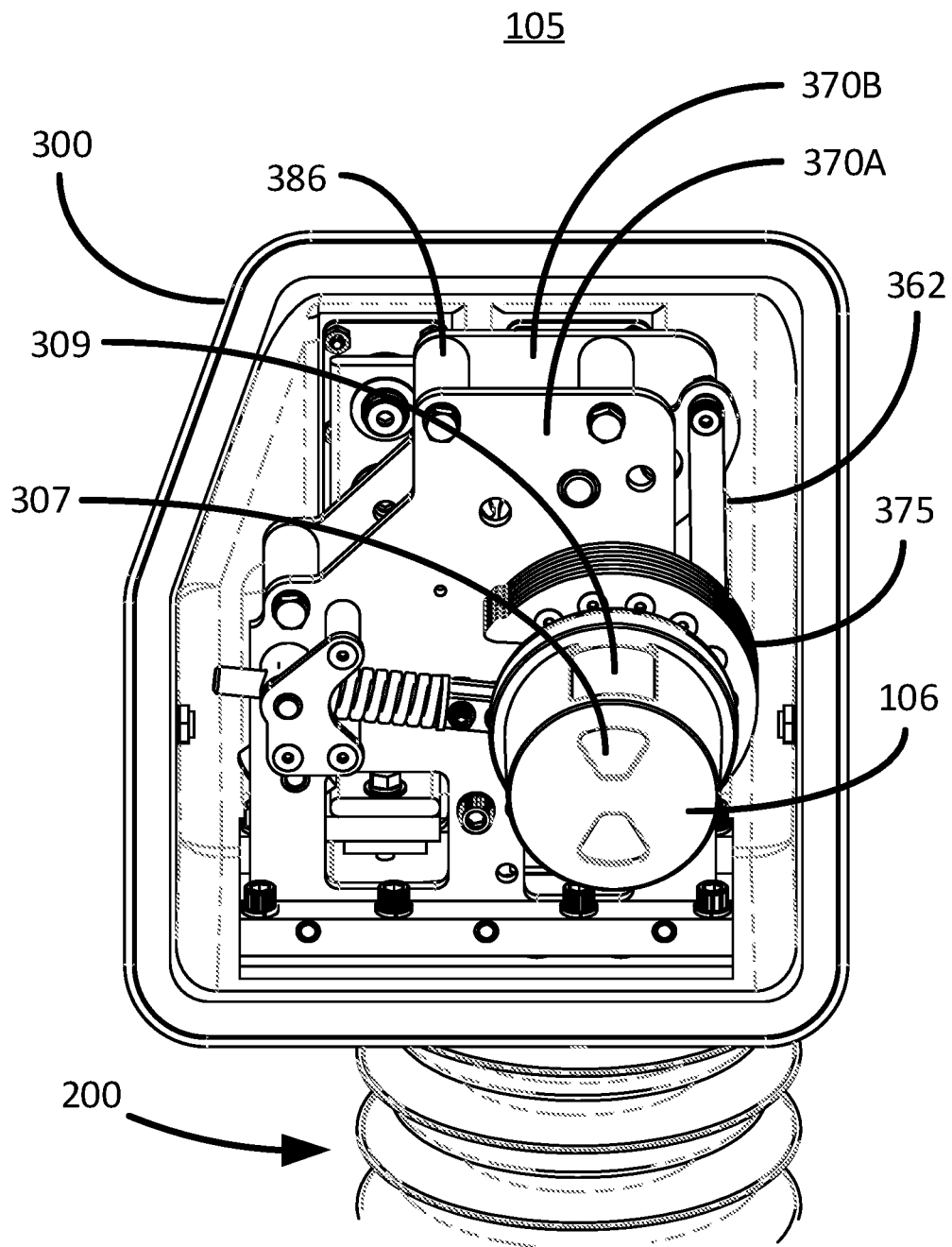

FIGS. 6A-6C are line drawings illustratively depicting a rotating mass configuration in the actuator mechanism 300, wherein the actuator mechanism down facing cover 108 (of FIG. 2A) is removed. For purposes of orienting the reader, FIG. 6A references some previously discussed components, partially obscured by a section plate 370, such as portions of the power pathway, which include the flexible busbar 312 and an electrical contact post 320, as well as the lead linkage arm 362 and the linkage plate 330. A portion the vacuum bottle assembly 200 extending from the top of the actuator mechanism 300 is also shown. In FIG. 6A, the actuator mechanism 300 is in the open orientation. The key elements here include a rotating mass 375 that rotates about the indicator shaft pivot point 328 of the open/close indicator shaft point 325. An open toggle compression spring 380 is attached to the rotating mass 375 at a pivot end 374 and is retained at a retention plate 378 that provides stability for the oppositely located pivot point of the open toggle compression spring 382. The open toggle compression spring 380 regulates or otherwise smooths movement of the rotating mass 375. The rotating mass 375 further includes a torsion spring 372 at the indicator shaft pivot point 328. The rotating mass 375 is connected to the open/close circuit linkage 364 to help assist in slowing down the motion of the contacts 210 and 212 when closing.

FIG. 6B shows the actuator mechanism 300 in the closed orientation with the lead linkage arm 362 extending upwards and the rotating mass 375 rotated counterclockwise. Note that the open toggle compression spring 380 is pivoted.

FIG. 6C is a perspective line drawing of the actuator mechanism 300 tilted downwards to show the 3-D perspective of the components of the actuator mechanism 300. For reference, a portion of the vacuum bottle assembly 200 is shown. At this angle, it is easily seen that the lead linkage arm 362 and the other associated components shown in FIG. 4A are sandwiched between the two section plates 370A and 370B, which are separated by stays 386. In this embodiment, the rotating mass 375 is formed from plurality of plates that are pinned together, as shown. Further, at this angle, the attached open/close indicator 106, is attached to the open/close indicator shaft 326 (hidden), shows the bottom view indicator 307 and one of the side view visual indicators 309.

Figure 7A:
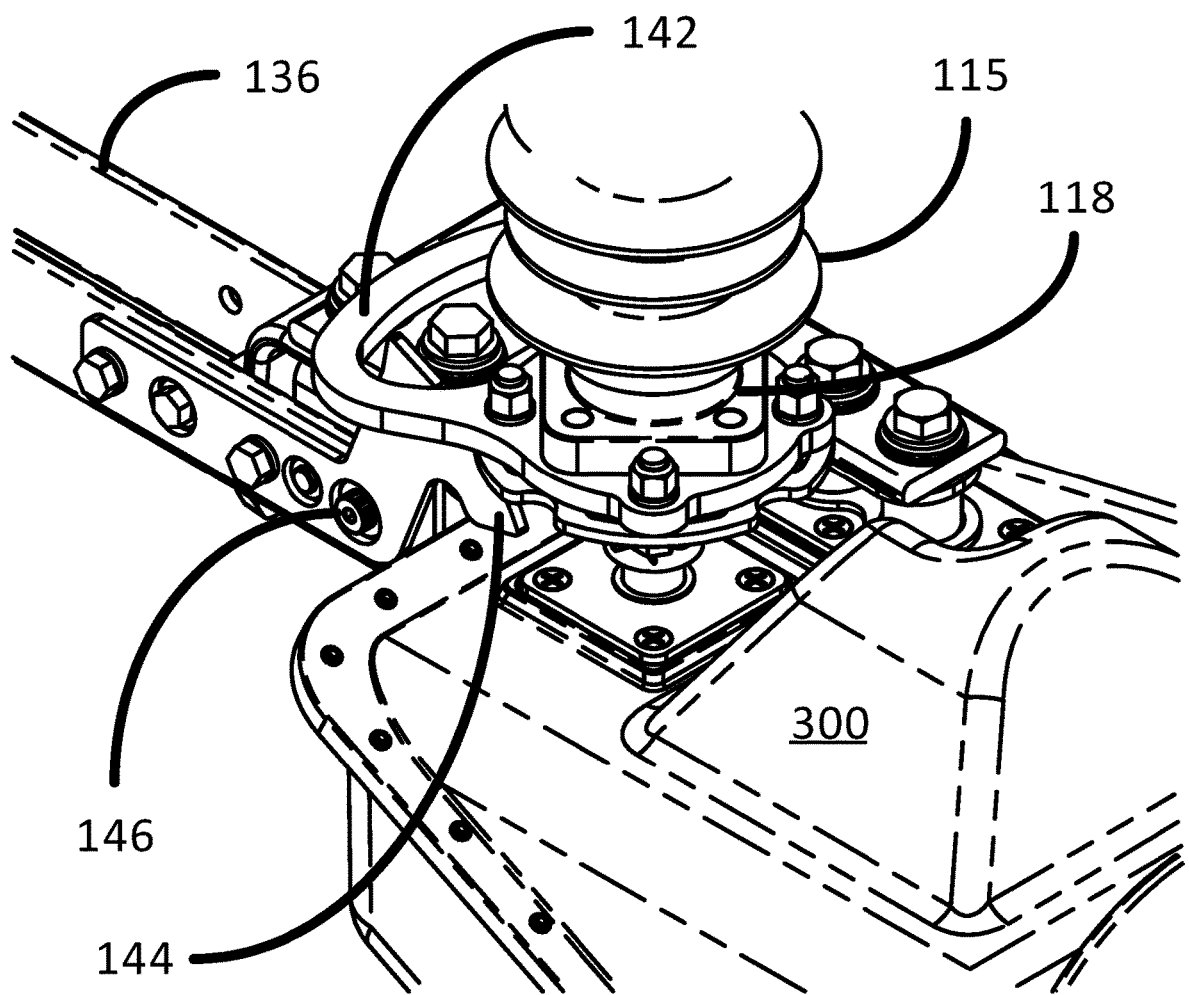
FIGS. 7A and 7B are line drawings illustratively depicting the interlocking mechanism for the visual disconnect consistent with embodiments of the present invention.
Figure 7B:
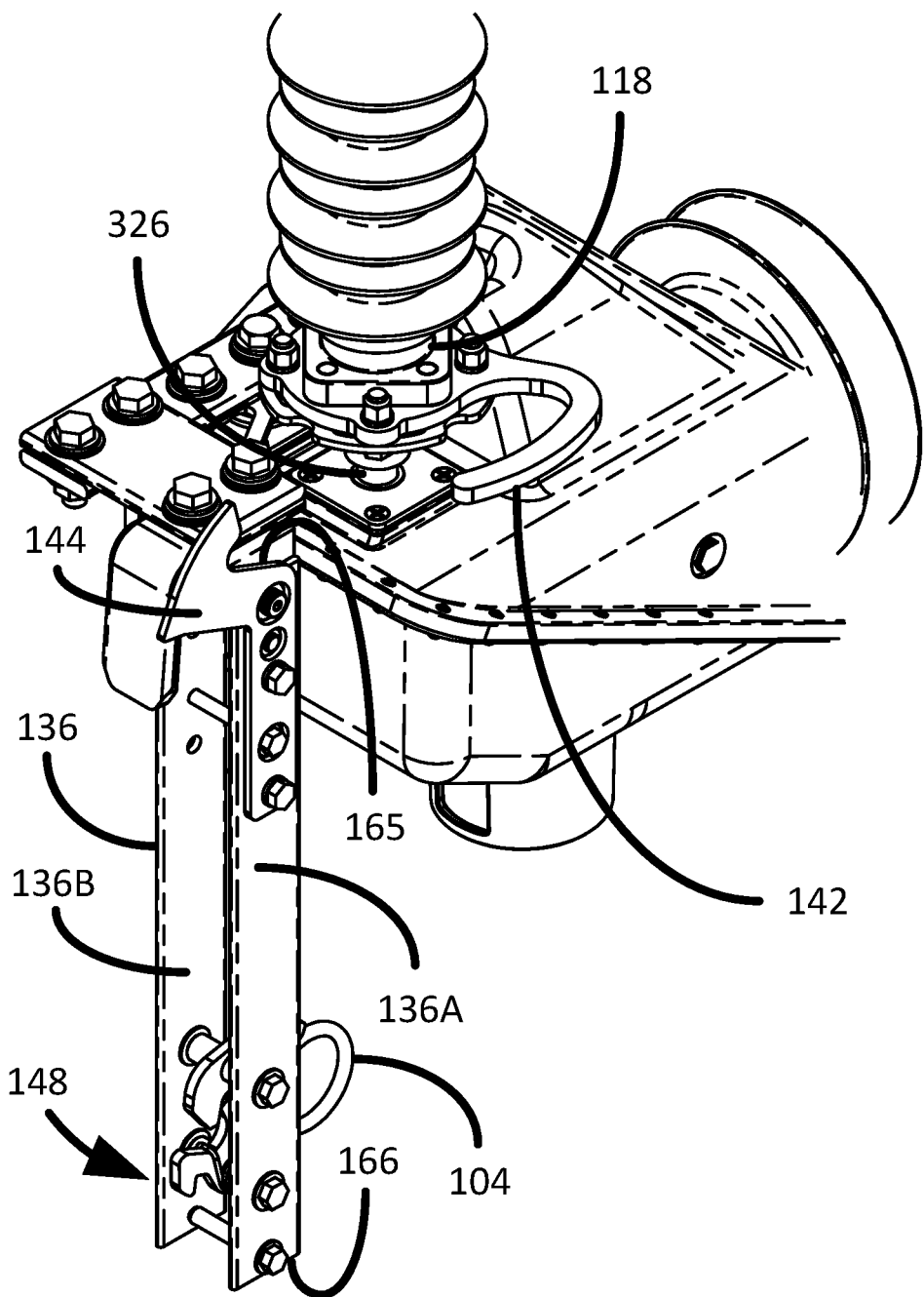

FIGS. 7A and 7B are line drawings illustratively depicting the interlocking mechanism for the visual disconnect consistent with embodiments of the present invention. The visual disconnect is the blade arm 136 that pivots about a blade pivot shaft 146 in either an open or closed orientation. As shown in FIG. 7A and FIG. 1A, the blade arm 136 is up (i.e., connected) and therefore there is no visual break in the vacuum switch 105. The visual break alerts an onlooker that the circuit is connected, i.e., the powerline pathway 121 is closed. An interlock release hook 142 locks the interlock plate 144, and therefore the disconnect blade 136, in place. Hence, when the interlock release hook 142 is locked, the blade arm 136 will not be able to disconnect or otherwise open even if the disconnect blade ring 104 is pulled to open the disconnect blade 136. The interlock release hook 142 is tied to the actuator mechanism 300 and can only open when the vacuum switch 105 is open. More specifically, the spindle 118 is connected to the open/close pivot shaft 326 shown extending from the actuator mechanism up facing cover 109 in FIG. 2C. Accordingly, a vacuum switch motor (not shown) can be made to open and close the vacuum switch 105 by rotating the rotating spindle 118 inside of the rotating spindle insulator 115, as previously discussed. Because the interlock release hook 142 is connected to the spindle 118 of the open/close pivot shaft 326, either directly or indirectly through an intermediary element, when the rotating spindle 118 is rotated so is the interlock release hook 142. So, when the spindle 118 is rotated in an open direction to a fully open position (that opens or otherwise disconnects the vacuum switch 105), the interlock plate 144 is likewise rotated to a fully open position, which unlocks the interlock plate 144. This permits the disconnect blade ring 104 to unlatch the disconnect blade 136 when pulled by an electrician via a hot stick hook (not shown).

FIG. 7B illustratively depicts the blade arm 136 visually disconnecting the power across the underarm vacuum break switch arrangement 100. As shown, the rotating spindle 118, and hence the interlock release hook 142, are rotated 90°, which unlocks the interlock plate 144. Other embodiments contemplate different rotational angles being used so long as the interlock release hook 142 releases the interlock plate 144. With the interlock plate 144 unlocked, the disconnect blade ring 104 is enabled to release the disconnect blade 136. Accordingly, with the interlock plate 144 unlocked, when the disconnect blade ring 104 is pulled, a disconnect linkage 148 inside of the blade arm 136, between the first blade arm side 136A and the second blade arm side 136B, disengages the disconnect blade 136. In other words, with the interlock plate 144 unlocked, pulling the disconnect blade ring 104 causes the blade arm 136 to unlock and drop in the disconnected orientation, as shown in FIGS. 1B and 7B.

Figure 8A:
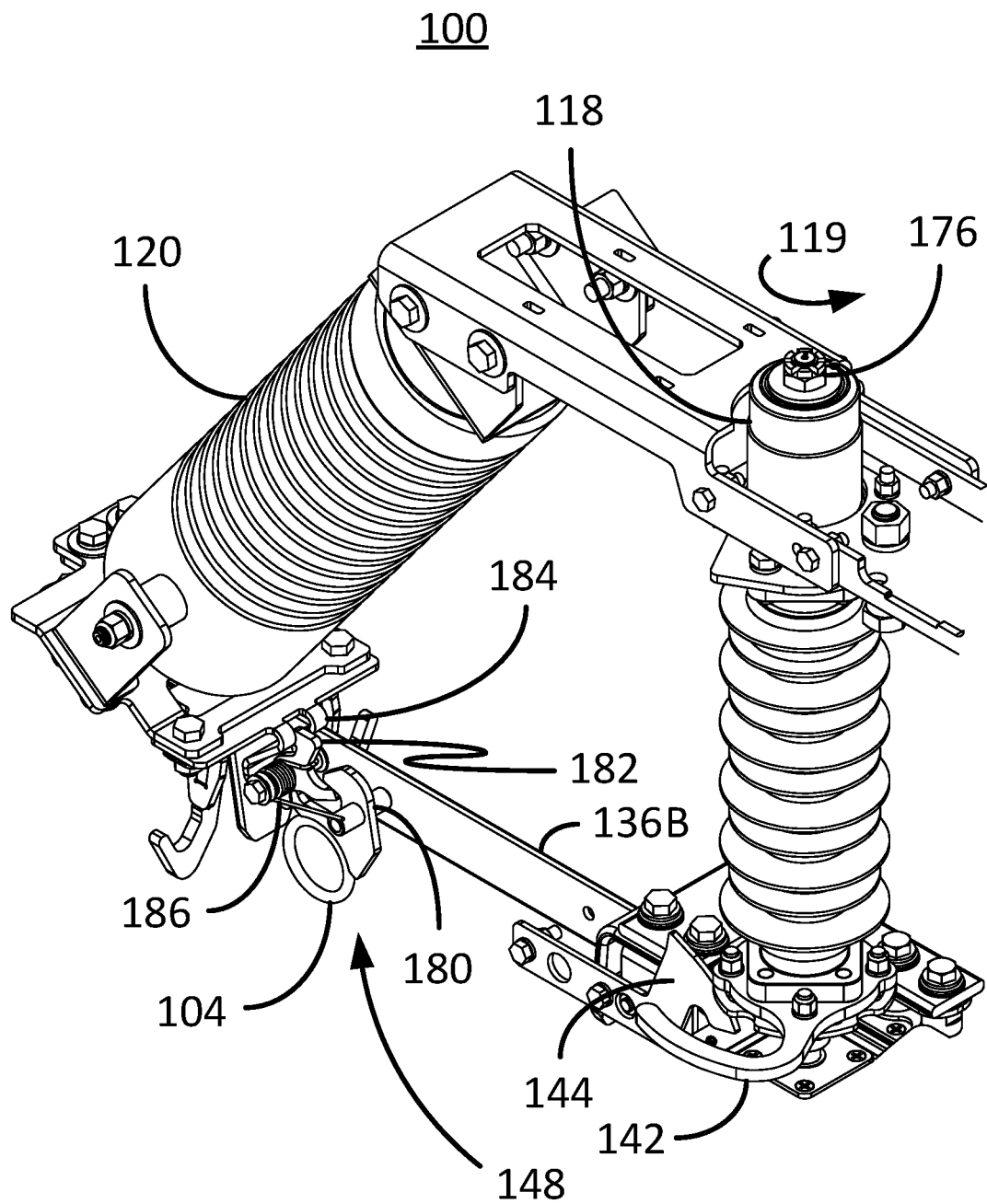
FIGS. 8A-8C are various line drawing views of the release latch consistent with embodiments of the present invention.
Figure 8B:
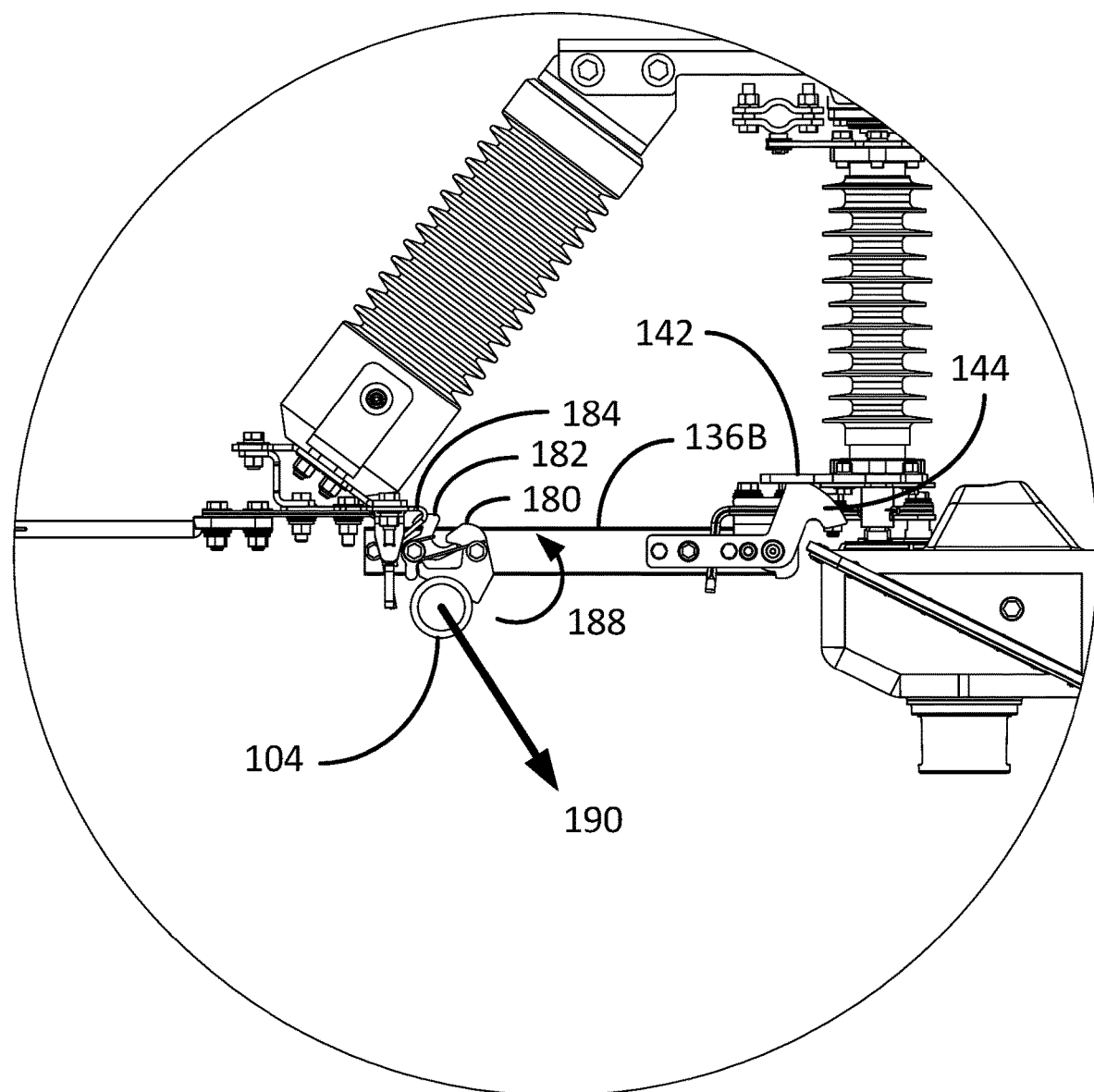
Figure 8C:
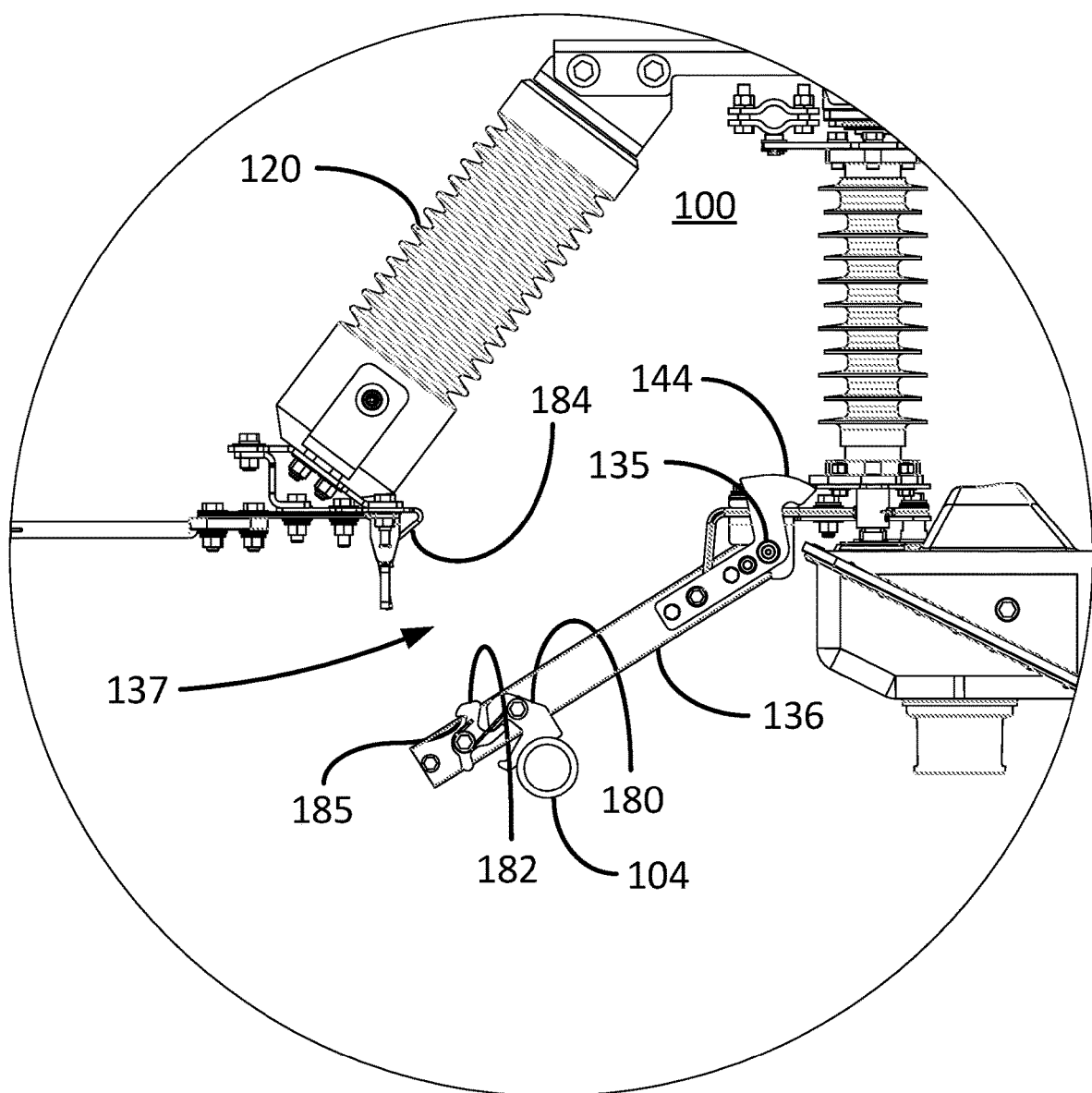

FIGS. 8A-8C are various line drawing views of the release latch 148 consistent with embodiments of the present invention. With respect to FIG. 8A, depicted is a perspective drawing of a portion of the underarm vacuum break switch arrangement 100 showing the release latch 148 with the disconnect blade arm 136 closed or otherwise connected to the release latch 148. In this present perspective, the first blade arm side 136A is removed to better show the components of the release latch 148, wherein only the second blade arm side 136B is shown. In this arrangement, the rotating spindle 118 is rotated in the open position 119, which opens the interlock release hook 142 thereby releasing or unlocking the interlock plate 144. As mentioned earlier, with the interlock plate 144 unlocked, the release latch 148 is enabled to release the disconnect blade arm 136 in the open orientation. The release latch 148 is located approximately where the voltage sensor 120 connects to the powerline pathway 121. When latched, the release latch 148 generally comprises a first cam latch 180 that hooks on a second cam latch 182 wherein the second cam latch 182 hooks onto a latch retaining bar 184 that is integrated with the left terminal 130. The disconnect blade ring 104 is integrated with the first cam latch 180, as shown. A latch spring 186 is connected to the first and second cam latch 180/182, which biases the second cam latch 182 in the retained position on the latch retaining bar 184.

FIG. 8B is a side view line drawing of the portion of the underarm vacuum break switch arrangement 100 showing the release latch 148 with the disconnect blade arm 136 closed and connected to the release latch 148 as shown in FIG. 8A. When the disconnect blade ring 104 is pulled in the pulling direction 190, such as with a hot stick from below the underarm vacuum break switch arrangement 100, the first cam latch 180 is rotated counterclockwise as shown by the arrow 188. By rotating the first cam latch 180 counterclockwise 188, the second cam latch 182 rotates clockwise, which unlatches the second cam latch finger 185 from the latch release bar 184. As previously mentioned, only the second blade arm side 136B is shown to better reveal the release latch components 148.

FIG. 8C illustratively depicts the disconnect blade arm 136 in the open orientation after the disconnect blade ring 104 has been pulled. As shown, the disconnect blade arm 136 is partially hanging downward via the hinge 135, which produces the air gap 137 that visibly shows electrical break in the underarm vacuum break switch arrangement 100. As depicted, the second cam latch 182 is in rotated in an unlatched orientation (via the first cam latch 180) wherein the second cam latch finger 185 is retracted (causing the release from the latch retaining bar 184).

With the present description in mind, below are some examples of certain embodiments illustratively complementing some of the methods and apparatus embodiments discussed above and presented in the figures to aid the reader. The elements called out below are provided by example to assist in the understanding of the present invention and should not be considered limiting. The reader will appreciate that the below elements and configurations can be interchangeable within the scope and spirit of the present invention.

In that light, one inventive aspect of the present invention that is generally directed to a visual air gap 137 formed when a disconnect blade 136 is opened, as mainly depicted in FIGS. 1A-1D and 7A-7B though features and characteristics of the present embodiment are shown in all the other figures, contemplates an underarm vacuum break switch arrangement 100 as shown in FIG. 1A that generally includes a stationary post insulator 114 and a rotating spindle insulator 115 that are both connected to a phase base cross bar 116. The underarm vacuum break switch arrangement 100 is configured to connect two overhead powerlines 156A and 156B, see FIG. 1D, via a powerline pathway 121 of FIG. 1C. In this embodiment, the powerline pathway 121 includes a first powerline connector 128 that is connected to the first overhead powerline 156A via a powerline bypass junction 162, a second powerline connector 130 that is connected to the second overhead powerline 156B via another powerline bypass junction 162, a vacuum switch 105 and a disconnect blade 136. As discussed above, there are other components that obviously make up the powerline pathway 121, such as the left terminal 130 and the right sensor clamp 132, the disconnect blade busbar 140, etc., as shown in FIG. 1A-1C. As shown in FIG. 1C, the stationary post insulator 114, the rotating spindle insulator 115 and the phase base cross bar 116 are not along the powerline pathway 121, which should be appreciated because in order for the underarm vacuum break switch arrangement 100 to switch electricity off along the powerline 156 at the powerline bypass 158, no electricity can bypass the powerline pathway 121 when it is broken, which by definition means that there is no electrical continuity between the powerline bypass junctions 162. The vacuum switch 105 hangs from the phase base cross bar 116 via the stationary post insulator 114 and the rotating spindle insulator 118, meaning that the vacuum switch 105 is vertically below the phase base cross bar 116 and hangs means that the phase base cross bar 116 is largely holding the vacuum switch 105 in place above the ground. The disconnect blade 136 generally includes a disconnect latch 104 that when in a latched state, there is electrical continuity between the vacuum switch 105 and the second powerline connector 130 via the disconnect blade 136 (or more specifically between the powerline bypass junctions 162), as shown in FIGS. 1A and 1C. However, when the disconnect latch 104 is in an unlatched state there is electrical discontinuity between the vacuum switch 105 and the second powerline connector 130 (or more specifically between the powerline bypass junctions 162) via an airgap 137 (FIG. 1B) from the disconnected blade 136 that at least partially hangs, and in this case completely hangs (due to gravity) from a hinge 135, which in this embodiment is an axle pinning the disconnect blade 136 to a hanger extending downwards from the disconnect blade busbar 140, but the hinge 135 can easily be a number of different hinge arrangements known to those in the mechanical art.

The underarm vacuum break switch arrangement 100 embodiment can be further envisioned, wherein the stationary post insulator 114 and a rotating spindle insulator 115 are parallel, which is shown in the embodiments herein, but could be at angles as long as the inner rotating spindle 118 of the rotating spindle insulator 115 is made operable to rotate the open/close pivot shaft 326 of FIG. 4C.

The underarm vacuum break switch arrangement 100 embodiment is further envisioned, wherein the underarm vacuum break switch arrangement 100 is mounted to a utility pole 155 above the ground. A powerline pole 155 as envisioned herein can be a single pole, a pilon, such as a triangular pilon with crossbars, or any structure intended to hold up powerlines 156—generically used herein as "pole". In this embodiment, the powerline pathway 121 is in between the phase base cross bar 116 and the ground, as shown in FIG. 1D. The phase base cross bar 116 is essentially horizontal.

The underarm vacuum break switch arrangement 100 embodiment is further envisioned, wherein the disconnect latch 104 is a hot stick ring (or some other looped structure) that can accommodate a hot stick hook at the distal end of the hot stick used by an electrical technician to pull on the hot stick ring.

The underarm vacuum break switch arrangement 100 embodiment can further comprise a current and voltage sensor 110 and voltage only sensor 120. The current and voltage sensor 110 (shown in FIG. 1A as angled) is connected to the phase base cross bar 116 and the powerline pathway 121 between the first powerline connector (right terminal) 128 and the vacuum switch 105. The voltage only sensor 120 is connected to the base cross bar 116 and the powerline pathway 121 between the second powerline connector (left terminal) 130 and the disconnect blade 136.

The underarm vacuum break switch arrangement 100 can further comprise an interlock release hook 142 connected to a rotating pivot shaft 326, which extends upward from the vacuum switch 105. The rotating pivot shaft 326 is connected to an actuator linkage assembly 364 (in the actuator mechanism 300) on a first end 315 and a rotating spindle 118 inside of the rotating spindle insulator 115 on a second end 316, see FIG. 4C. The actuator linkage assembly 364 is configured to drive a dynamic contact 212 in contact with a static contact 210 to be in a closed orientation (i.e., electrically closed forming electrical continuity between the dynamic contact 212 and the static contact 210, as shown in FIGS. 3A and 3B) via the rotating pivot shaft 326 when the rotating spindle 118 is rotated 119 in a first position (e.g., when the rotating spindle 118 is rotated 119 clockwise). The dynamic contact 212 is not in contact (i.e., disconnected) from the static contact 210 when in an open orientation when the rotating spindle 118 is rotated in a second position (e.g., when the rotating spindle 118 is rotated 119 counterclockwise). Notably, the powerline pathway 221 further comprising the static contact 210 and the dynamic contact 212 that when in the open orientation, the powerline pathway 121 is broken (i.e., no continuity within the vacuum switch 105) and when in the closed orientation, the powerline pathway 121 is intact (i.e., closed with continuity within the vacuum switch 105). The interlock release hook 142 retains or otherwise locks the disconnect blade 136 in the latched state when in the closed orientation, which prevents an electrical technician from releasing the disconnect blade 136. The interlock release hook 142 does not retain/lock the disconnect blade 136 in the unlatched state when in the open orientation. Hence, an electrical technician sees that the vacuum switch 105 is open by way of the open/close indicator 106, which in one embodiment is a green signal, before they pull down on the disconnect blade ring 104 to unlatch the disconnect blade 136. When the disconnect blade 136 is dangling from the hinge 135, the electrical technician can be sure that there is no electrical continuity in the powerline bypass 158 due to the noticeably large air gap from the hanging disconnect blade 136, shown in FIG. 1B. The static contact 210 and the dynamic contact 212 are in a vacuum bottle 220 as shown in FIGS. 4A and 4B.

The underarm vacuum break switch arrangement 100 embodiment can further comprise an interlock release hook 142 connected to a rotating shaft 326 and 118 that passes through the rotating spindle insulator 115 and into the vacuum switch 105. The vacuum switch 105 has an open orientation that breaks (continuity in) the powerline pathway 121 when the rotating shaft 326 and 118 is in a first rotational position. The vacuum switch 105 has a closed orientation, which does not break (electrical continuity in) the powerline pathway 121 when the rotating shaft 326 and 118 is in a second rotational position. The interlock release hook 142 is configured to retain the disconnect blade 136 in the latched state when in the closed orientation. The interlock release hook 142 is also configured to retain the disconnect blade 136 in the fully open orientation when in the unlatched and open state.

In another embodiment of the present invention involving an airgap 137 that is formed by an open disconnect blade 136, as generally shown in FIGS. 1A-1D and 7A-7B, contemplates a powerline break switch arrangement 100 generally comprising a powerline pathway 121 that is configured to provide electrical continuity between a first overhead powerline 156A and a second overhead power line 156B. The powerline pathway 121 is defined by a plurality of components, or simply "components" comprising (among other elements) a vacuum switch 105, a disconnect blade 136, a first powerline connector (right connector of FIG. 1A) 128 that is configured to connect to the first overhead powerline 156A and a second powerline connector 130 that is configured to connect to the second overhead powerline 156B. The powerline break switch arrangement 100 further comprises a stationary post insulator 114 and a rotating spindle insulator 115 that are connected to and interposed between a cross bar 116 and the components. The cross bar 116 is insulated from the powerline pathway 121 via the stationary post insulator 114 and a rotating spindle insulator 115, in order to isolate the powerline pathway 121 from being bypassed along the cross bar 116. When the powerline break switch arrangement 100 is mounted to a utility pole 155, the cross bar 116 is further away from the ground than the components. In this embodiment, the vacuum switch 105 and the second powerline connector 130 are electrically connected when the disconnect blade 136 is in a latched orientation, that is when it is "up" and connected as shown in FIG. 1A. In the alternative, the vacuum switch 105 and the second powerline connector 130 are electrically disconnected when the disconnect blade 136 is in an unlatched orientation and at least partially hanging from a hinge 135, as depicted in FIG. 1B.

The powerline break switch arrangement 100 embodiment further envisions that when in the unlatched orientation, there is an air gap 137 between the second powerline connector 130 and the vacuum switch 105. The air gap 137 is visible to an onlooker (i.e., anyone looking up at the powerline break switch arrangement 100) from below the powerline break switch arrangement 100 when the powerline break switch arrangement 100 is mounted to the utility pole 155.

The powerline break switch arrangement 100 embodiment is contemplated to further comprise a disconnect latch 182 that cooperates with the disconnect blade 136 (i.e., bolted to and actuates the disconnect blade 136 that when the disconnect latch 182 is unfastened, the disconnect blade 136 is in the unlatched orientation and when the disconnect latch 182 is fastened, the disconnect blade 136 is in the latched orientation. This assumes that the embodiment either does not include the interlock release hook 142 or the interlock release hook 142 has been moved to unlock the disconnect blade 136. Certain other embodiments envision that if the interlock release hook 142 is not in an open orientation then the disconnect latch 182 cannot be pulled or otherwise actuated. In certain embodiments, the disconnect latch 182 is configured to be unfastened with an electrical hot stick that is used by an electrical technician.

The powerline break switch arrangement 100 embodiment is contemplated to further comprise an interlock release hook 142 connected to a rotating shaft 326 and 118, wherein the rotating shaft 326 and 118 passes through the rotating spindle insulator 115 and into the vacuum switch 105. The vacuum switch 105 has an open orientation that breaks, or otherwise disrupts, electrical continuity in the powerline pathway 121 when the rotating shaft 326 and 118 is in a first rotational position. The vacuum switch 105 has a closed orientation, which does not break the electrical continuity in the powerline pathway 121 when the rotating shaft 326 and 118 is in a second rotational position. The interlock release hook 142 is configured to lock the disconnect blade 136 in the latched state when in the closed orientation, but it does not retain the disconnect blade 136 in the latched state when in the open orientation. A motor (not shown) can be further added to this arrangement to rotate 119 the rotating shaft 326 and 118 in the first or the second rotational positions. The motor being connected to the rotating spindle insulator 115 via a spindle motor mount 176 located at a top side 172 of the cross bar 116 that is obverse to a bottom side 174 of the crossbar 116 wherein the rotating spindle insulator 115 extends towards the components.

Yet another embodiment of the of the present invention involving an airgap 137 that is formed by an open disconnect blade 136, as generally shown in FIGS. 1A-1D and 7A-7B, contemplates a method that includes providing a powerline break switch arrangement 100 comprising a powerline pathway 121 that provides electrical continuity between a first overhead powerline 156A and a second overhead power line 156B. The powerline pathway 121 is defined by components comprising a vacuum switch 105, a disconnect blade 136, a first powerline connector 128 and a second powerline connector 130. The first powerline connector 128 is configured and arranged to connect to the first overhead powerline 156A (via electrical bypass lines 164 and powerline bypass junctions 162) and the second powerline connector 130 is configured to connect to the second overhead powerline 156B. The powerline break switch arrangement 100 further comprises a stationary post insulator 114 and a rotating spindle insulator 115, which are connected to a cross bar 116 and the components. The stationary post insulator 114 and the rotating spindle insulator 115 are interposed between the cross bar 116 and the components. The cross bar 116 is insulated from the powerline pathway 121 via the stationary post insulator 114 and a rotating spindle insulator 115. The method continues with the step for mounting the powerline break switch arrangement 100 to a utility pole 155 with the cross bar 116 being further away from the ground than the components. Once electricity is running through the powerline break switch arrangement 100, the flow of electricity can be halted by electrically disconnecting the vacuum switch 105 from the second powerline connector 130, which is accomplished by moving the disconnect blade 136 from a latched orientation to an unlatched orientation. The unlatched orientation can be viewed from the ground by the air gap 137 created when the disconnect blade 136 is dangling from the powerline break switch arrangement 100.

The method embodiment is contemplated to further comprise disengaging a release latch 148 when initiating the moving step. The release latch 148 is on a first end 165 of the disconnect blade 136 and a hinge 135 on a second end 165 of the disconnect blade 136 (as shown in FIG. 7B). The release latch 148 holds the disconnect blade 136 in line, i.e., in electrical continuity, with the powerline pathway 121 when the vacuum switch 105 is closed or otherwise has electrical continuity across the contacts 210 and 212.

The method embodiment is contemplated to further comprise disengaging the release latch 148 by pulling down on a disconnect ring 104 that is coupled to the release latch 148 via a hot stick (not shown).

The method embodiment is further contemplates viewing an air gap 137 from below the powerline break switch arrangement 100 when the disconnect blade 136 is hanging from the hinge 135 after the moving step.

The method embodiment further contemplating providing an interlock release hook 142 that is connected to a rotating shaft 326 and 118. The rotating shaft 326 and 118 passes through the rotating spindle insulator 115 and into the vacuum switch 105.

Yet other embodiments of the present invention contemplate a vacuum bottle insulator used to electrically insulate a vacuum bottle 220, as mainly depicted in FIGS. 3A-3B, though features and characteristics of the present embodiment are shown in all the other figures. Accordingly, this aspect of the invention contemplates an overhead power line vacuum switch 100 that generally comprises a vacuum bottle arrangement 200 that includes a vacuum bottle 220 containing a fixed electrical contact 210 and a dynamic electrical contact 212. The vacuum bottle 220 has a tubular member 232 that extends between a fixed contact end 228 and a dynamic contact end 230. At least 75% of the tubular member 232 is encapsulated in a urethane insulator 222. A rigid fiberglass shell 226 is sandwiched between an outer vacuum bottle silicone overmold 202 and the urethane insulator 222. The dynamic electrical contact 212 is fixedly attached to an actuator 300 that is configured to drive the dynamic electrical contact 212 in either an open state or a closed state with the fixed electrical contact 210, wherein the open state is when the dynamic electrical contact 212 is spaced apart from the fixed electrical contact 210 and the closed state is when the dynamic electrical contact 212 is in contact with the fixed electrical contact 210.

The overhead power line vacuum switch embodiment 100 further imagines that the outer vacuum bottle silicone overmold 202 includes a plurality of ice-and-water sheds 204 that are concentrically disposed around a vacuum bottle assembly axis 208 that runs axially though the vacuum bottle arrangement 200. This could further be where the outer vacuum bottle silicone overmold 202 and the plurality of ice-and-water sheds 204 are a single molded element. In another embodiment, the vacuum bottle 220 comprises the vacuum bottle 3-ply housing 233 that encircles a vacuum region 224 radially as defined by the vacuum bottle assembly axis 208. In this embodiment, the vacuum bottle 3-ply housing 233 consists of the urethane insulator 222, the rigid fiberglass shell 226, and the outer vacuum bottle silicone overmold 202. The vacuum region 224 is in the vacuum bottle 220.

The overhead power line vacuum switch embodiment 100 further imagining the urethane insulator 222 covering a portion of both ends 234 and 236 of the vacuum bottle 220.

The overhead power line vacuum switch embodiment 100 further envisioning that the vacuum bottle arrangement 200 is anchored to the right terminal pad 133 via a fixed contact lead screw 214 that is screwed into the fixed electrical contact 210.

The overhead power line vacuum switch embodiment 100 further envisioning that the dynamic electrical contact 212 is fixedly attached to a driving linkage 360 in the actuator 300 via a dynamic contact lead screw 215.

The overhead power line vacuum switch embodiment 100 further comprising an aluminum mounting channel 206 that is connected to the vacuum bottle arrangement 200 at the fixed contact end 228, the urethane insulator 222, the rigid fiberglass shell 226 and the outer vacuum bottle silicone overmold 202 butt up against or otherwise terminate at the aluminum mounting channel 206.

The overhead power line vacuum switch embodiment 100 further envisioning that the vacuum bottle 220 is composed of porcelain ceramic.

Other embodiments of a vacuum bottle insulator used in an overhead power line vacuum switch 100, which are mainly depicted in FIGS. 3A-3B, envision a vacuum bottle arrangement 200 comprising a vacuum bottle 220 arranged with a tubular portion 232 extending along an axis 208 between a vacuum bottle stationary end 234 and a vacuum bottle dynamic end 236, which are in an internal vacuum chamber 224. The vacuum bottle arrangement 200 has a fixed electrical contact 210 extending into the internal vacuum chamber 224 from the vacuum bottle stationary end 234 and a dynamic electrical contact 212 extending into the internal vacuum chamber 224 from the vacuum bottle dynamic end 236. The tubular portion 232 that is surrounded by a urethane insulator 222 is at least partially surrounded by a rigid shell 226 that is at least partially surrounded by a vacuum bottle silicone overmold 202. Accordingly, electricity is configured to flow through the fixed electrical contact 210 and the dynamic electrical contact 212 when the dynamic electrical contact 212 is moved into contact with the fixed electrical contact 210.

The vacuum bottle arrangement 200 further envisions the vacuum bottle overmold (ice-and-water shield) 202 being silicone.

The vacuum bottle arrangement 200 further envisions the rigid shell 226 being fiberglass.

The vacuum bottle arrangement 200 further envisions an embodiment wherein only the urethane insulator 222, the rigid shell 226 and vacuum bottle silicone overmold 202 surround the tubular portion 232.

The vacuum bottle arrangement 200 further envisions that the vacuum bottle 220, the urethane insulator 222, the rigid shell 226 and vacuum bottle silicone overmold 202 are insulators that essentially prevent the flow of electricity therethrough. In this way, when the contacts 210 and 212 are disconnected, there is a break in the flow of electricity.

The vacuum bottle arrangement 200 further envisions that the urethane insulator 222 covers a portion of the vacuum bottle stationary end 234 and the vacuum bottle dynamic end 236.

In the vacuum bottle arrangement 200, the vacuum bottle 220 can be porcelain ceramic.

The vacuum bottle arrangement 200 can further comprise a plurality of ice-and-water sheds 204 that concentrically extend outwardly from the vacuum bottle silicone overmold 202.

Still, another embodiment of a vacuum bottle insulator used to prevent the flow of electricity across the ends of a vacuum bottle switch 200 envisions a method directed to a vacuum bottle switch 200 that includes a vacuum bottle 220 arranged with a tubular portion 232 extending along an axis 208 between a vacuum bottle stationary end 234 and a vacuum bottle dynamic end 236, the vacuum bottle 220 comprising an internal vacuum chamber 224, the vacuum bottle switch 200 defined between a first end 228 and a second end 230. The method includes a step for flowing electricity between the first end 228 and the second end 230 through a fixed electrical contact 210 and a dynamic electrical contact 212 when electrically connected. The fixed electrical contact 210 extends into the internal vacuum chamber 224 from the first end 228 and a dynamic electrical contact 212 extends into the internal vacuum chamber 224 from the second end 230. A step for halting the flow of the electricity through the fixed electrical contact 210 and the dynamic electrical contact 212 is accomplished by separating the fixed electrical contact 210 and the dynamic electrical contact 212. The vacuum bottle switch arrangement 200 comprises an insulating vacuum bottle switch housing 200 that prevents essentially/virtually any of the electricity from flowing between the first end 228 and the second end 230 when the fixed electrical contact 210 and the dynamic electrical contact 212 are separated. The vacuum bottle silicone overmold 202 surrounds the tubular portion 232 by a urethane insulator 222 that is at least partially surrounded by a rigid shell 226 that is at least partially surrounded by a vacuum bottle silicone overmold 202.

The method embodiment contemplates that the vacuum bottle silicone overmold 202 is silicone and the rigid shell 226 is fiberglass.

On aspect of the method embodiment contemplates that only the urethane insulator 222, the rigid shell 226 and vacuum bottle silicone overmold 202 surround the tubular portion 232.

Another inventive aspect of the present invention is directed to a shock absorber 350 that is inside of the mechanical actuator 300. The shock absorber 350 is used to reduce the moving mass and kinetic energy of the mechanism linkage and dynamic electrical contact 212 during the closing event in the vacuum switch 105, as mainly depicted in FIGS. 5A-5E, though features and characteristics of the present embodiment are shown in all the other figures. Accordingly, this aspect of the invention contemplates a power line vacuum switch 105 comprising a vacuum bottle switch 200 that includes a fixed electrical contact 210 and a dynamic electrical contact 212 (as shown in FIGS. 3A and 3B) that is connected to a vacuum bottle switch actuator 300, which includes an open/close circuit linkage 364 that is connected to the dynamic electrical contact 212 via a dynamic contact lead screw 215 and shock absorber assembly 350. The shock absorber 350 generally comprises a housing 356 with a shock absorber housing cover 342 and a shock absorber housing port 355 that is opposite to the shock absorber housing cover 342, a shock absorber compression spring 352 disposed inside of the housing 356 and connected to the shock absorber housing cover 342, wherein the open/close circuit linkage 364 is connected to the shock absorber housing cover 342 outside of the housing 356. The power line vacuum switch 100 has an open orientation with the shock absorber compression spring 352 in an uncompressed state when the dynamic electrical contact 212 is separated from the fixed electrical contact 210 and a closed orientation with the shock absorber compression spring 352 in a compressed state when the dynamic electrical contact 212 is connected to the fixed electrical contact 210. The open/close circuit linkage 364 is spaced closer to the fixed electrical contact 210 in the closed orientation as compared to the open orientation. The shock absorber compression spring 352, the shock absorber housing cover 342, the fixed electrical contact 210, the dynamic electrical contact 212, and the shock absorber housing port 355 are symmetric about a vacuum bottle assembly axis 208.

The power line vacuum switch embodiment 105 is further envisioned wherein the dynamic contact shaft 250 comprises a spring compression hub 354 and a stop flange 345, the spring compression hub 354 is configured to slide in and out of the shock absorber housing port 355 and the stop flange 345 is captured within the housing 356.

The power line vacuum switch embodiment 105 contemplates that the shock absorber compression spring 352 has a higher spring compressive force when in the closed orientation than when in the open orientation.

The power line vacuum switch embodiment 105 contemplates that the shock absorber compression spring 352 is configured to reduce the moving mass and kinetic energy of the mechanism linkage and dynamic electrical contact 212 when the dynamic electrical contact 212 moves from the open orientation to the closed orientation.

The power line vacuum switch embodiment 105 envisions that the open/close circuit linkage 364 connects to the shock absorber housing 356 via a housing-linkage extension arm 365. The open/close circuit linkage 364 can connect to the housing-linkage extension arm 365 at a housing-linkage pivot point 366.

The power line vacuum switch embodiment 105 further envisioning that the shock absorber housing 356 is configured to move along the axis 208 between the open orientation and the closed orientation.

In yet another a shock absorber embodiment 350 of a vacuum switch arrangement 105, a vacuum switch actuator 300 can comprise a linkage 364 that drives a dynamic contact lead screw 215 closer to a vacuum bottle assembly 200 when in a first position than when in a second position. The dynamic contact lead screw 215 is fixedly connected to a dynamic electrical contact 212 that electrically connects to a fixed electrical contact 210 only when in the first position. A shock absorber compression spring 352 is interposed between the linkage 364 and the dynamic contact lead screw 215, wherein the dynamic electrical contact 212 comprises higher resistance from the shock absorber compression spring 352 when in the first position compared with the second position. When in the first position, the dynamic electrical contact 212 and the fixed electrical contact 210 are electrically connected inside of a vacuum bottle 220.

The vacuum switch actuator embodiment 300 envision that the shock absorber compression spring 352 can optionally be a coil spring, wherein the shock absorber compression spring 352, the shock absorber housing 356, the fixed electrical contact 210, the dynamic electrical contact 212, and a shock absorber housing port 355, which accommodates the dynamic contact shaft 250, are symmetric about an axis 208.

The vacuum switch actuator embodiment 300 further envision that the dynamic contact shaft 250 could comprise a spring compression hub 354 and a stop flange 345, the spring compression hub 354 can be configured to slide in and out of a shock absorber housing port 355, the stop flange 345 can be captured within the housing 356. In one option, the dynamic contact lead screw 215 and the spring compression hub 354 are a single piece of material.

The vacuum switch actuator embodiment 300 envisions that the linkage 364 connects to the shock absorber housing 356 via a pivot point 366 in a housing-linkage extension arm 365.

The vacuum switch actuator embodiment 300 envisions that the shock absorber housing 356 slidingly engages an anchor strap 358, which limits movement of the shock absorber housing 356 along the axis 208.

The vacuum switch actuator embodiment 300 envisions that the shock absorber compression spring 352 is configured to reduce the moving mass and kinetic energy of the mechanism linkage and dynamic electrical contact 212 when the dynamic electrical contact 212 moves from the second position to the first position.

Still, another embodiment of the present invention using a shock absorber 350 in a method to reduce the moving mass and kinetic energy of the mechanism linkage and dynamic electrical contact 212 when the contact between a fixed electrical contact 210 and a dynamic electrical contact 212 meet inside of a vacuum bottle 220. The method can comprise a step for moving the dynamic electrical contact 212 from an open orientation to a closed orientation relative to the fixed electrical contact 210 via an open/close circuit linkage 364, wherein the closed orientation is when the fixed electrical contact 210 is connected to the dynamic electrical contact 212. A step for resisting the moving step via a shock absorber compression spring 352 that is interposed between a dynamic contact lead screw 215, which is connected to the dynamic electrical contact 212 and a shock absorber housing cover 342. The dynamic contact lead screw 215 cooperates with the shock absorber compression spring 352 during the resisting step.

The method embodiment further contemplates that the shock absorber compression spring 352 is compressed during the resisting step.

The method embodiment further contemplates that the shock absorber compression spring 352 is inside of a shock absorber housing 356. The shock absorber housing 356 comprises a dynamic contact shaft port 355 at a first end and the shock absorber housing cover 342 at a second end. This can further comprise sliding the dynamic contact lead screw 215 through the dynamic contact shaft port 355 along a common axis 208. This could also comprise the shock absorber compression spring 352, the dynamic contact shaft port 355, the fixed electrical contact 210, the dynamic electrical contact 212, and the dynamic contact shaft 250 being symmetric about an axis 208.

Another inventive aspect of the present invention is generally directed to a rotational mass 375 that is inside of the mechanical actuator 300, which is used to slow down the closing event in the vacuum switch 105. Embodiments of the rotation mass 375 in a mechanical actuator 300 is mainly depicted in FIGS. 5A-5C and 6A-6C, though features and characteristics of the present embodiment are shown in all the other figures. Accordingly, this aspect of the invention contemplates a power line vacuum switch 105 comprising a vacuum bottle switch 200 that includes a fixed electrical contact 210 and a dynamic electrical contact 212 (as shown in FIGS. 3A and 3B) that is connected to a vacuum bottle switch actuator 300, which includes an open/close circuit linkage 364 that is connected to the dynamic electrical contact 212 via a dynamic contact lead screw 215. The power line vacuum switch 105 in an open orientation when the dynamic electrical contact 212 is separated from the fixed electrical contact 210 and in a closed orientation when the dynamic electrical contact 212 is contacting the fixed electrical contact 210. The power line vacuum switch 105 further comprises an indicator shaft 325 that cooperates with the open/close circuit linkage 364 (e.g., the indicator shaft 325 is connected to the linkage 364 at the indicator shaft pivot point 328), wherein the open/close circuit linkage 364 is configured to pivot in a first direction 332 about the indicator shaft 325, which moves the dynamic electrical contact 212 in the open orientation, and pivot in a second direction 334 that is opposite the first direction, which moves the dynamic electrical contact 212 in the closed orientation. A rotating mass 375, also connected to the indicator shaft 325 in a pivoting relationship (meaning the rotating mass 375 pivots about the indicator shaft 325 at pivot point 328), is configured to rotate, which resists the movement of the dynamic electrical contact 212 when transitioning from the open orientation to the closed orientation due to the inertia required to move the mass. This slows down the electrical contacts 210 and 212 when they make contact.

The power line vacuum switch 105 embodiment can further comprise an open toggle compression spring 380 that stabilizes rotation of the rotating mass 375, e.g., keeping the mass aligned and from wobbling. The open toggle compression spring 380 also is used to keep the dynamic vacuum bottle lead screw 215 in the open position while the linkage plate 330 and driving plate spring 310 are in the traveling position somewhere between fully open and fully closed.

The power line vacuum switch 105 embodiment further includes the fixed electrical contact 210 and the dynamic electrical contact 212 being in a vacuum bottle 220. As mentioned earlier, the rotating mass 375 is configured to resist the movement of the dynamic electrical contact 212 when commencing transitioning from the open orientation to the closed orientation. In addition, the rotating mass 375 is configured to cooperate with a shock absorber assembly 350 (of FIGS. 5D and 5E), which reduces the moving mass and kinetic energy of the mechanism linkage and dynamic electrical contact 212 during the transition from the open orientation to the closed orientation.

The power line vacuum switch 105 embodiment can further be envisioned, wherein the open/close circuit linkage 364 comprises an indicator shaft linkage 363 linked to a lead linkage arm 362 at a first end 361 and to a contact linkage 360 at a second end 359, the indicator shaft linkage 363 is connected to the indicator shaft 325 in a pivoting relationship (i.e., rotating/moving around a pivot point). Furthermore, the lead linkage arm 362 and the contact linkage 360 are configured to essentially move in opposite directions when the rotating mass 375 rotates.

The power line vacuum switch 105 embodiment is further configured to connect with a first power line 156A and a second power line 156B, the first power line 156A is electrically connected to the second power line 156B when the dynamic electrical contact 212 and the fixed electrical contact 210 are in the closed orientation.

In yet another rotational mass 375 embodiment used in the vacuum bottle switch actuator 300, a vacuum switch arrangement 105 is envisioned to be operable with a power line vacuum switch 100, the vacuum switch arrangement 105 comprising a fixed electrical contact 210 and a dynamic electrical contact 212 disposed in a vacuum bottle 220. The vacuum bottle switch actuator 300 is configured and arranged to move the dynamic electrical contact 212 from an open orientation, where the dynamic electrical contact 212 is spaced apart from the fixed electrical contact 210 to a closed orientation, where the dynamic electrical contact 212 is in contact with the fixed electrical contact 210. The rotating mass 375 and a linkage 360 and 361 are both pivotally connected to an indicator shaft 325. The linkage 360 and 361 is configured to move the dynamic electrical contact 212 from the open orientation to the closed orientation and the rotating mass 375 is configured to slow the movement of the dynamic electrical contact 212 when going from the open orientation to the closed orientation, which occurs when the indicator shaft 325 is rotated in a first direction 334.

The power line vacuum switch 105 embodiment further contemplates the dynamic contact lead screw 215 being connected to a shock absorber assembly 350.

The power line vacuum switch 105 embodiment further contemplates the power line vacuum switch 100 being connected to a first power line 156A and a second power line 156B. The first power line 156A is electrically connected to the second power line 156B when the dynamic electrical contact 212 and the fixed electrical contact 210 are in the closed orientation.

The power line vacuum switch 105 embodiment further contemplates the shock absorber assembly 350 being configured to assist the rotating mass 375 in slowing down the dynamic electrical contact 212 when (the dynamic electrical contact 212) moving from the open orientation to the closed orientation.

The power line vacuum switch 105 embodiment further includes the fixed electrical contact 210 and the dynamic electrical contact 212 are in a vacuum bottle 220.

The power line vacuum switch 105 embodiment further contemplates the linkage 360 and 361 being configured to pivot in a second direction that is opposite the first direction, which moves the dynamic electrical contact 212 in the open orientation.

The power line vacuum switch 105 embodiment further contemplates an open toggle compression spring 380 stabilizing rotation of the rotating mass 375.

Another embodiment of the present invention contemplates using a rotational mass 375 in a method for slowing down a dynamic electrical contact 212 when contacting a fixed electrical contact 210 inside of a vacuum bottle 220. The method comprises a step for moving the dynamic electrical contact 212 from an open orientation when spaced apart from the fixed electrical contact 210 to a closed orientation when the dynamic electrical contact 212 is in contact with the fixed electrical contact 210. During the moving step, a linkage 360 and 361 is rotated in a vacuum bottle switch actuator 300 about an indicator shaft 325 from a first position to a second position. The moving step is slowed down via a rotating mass 375 that is fixedly attached to the indicator shaft 325.

The method embodiment provides that the vacuum bottle switch actuator 300 and the vacuum bottle 220 are included in a power line vacuum switch 100.

Aspects of the method embodiment envision the dynamic electrical contact 212 being resisted by the rotating mass 375 more when initially commencing the moving step than when just before completing the moving step. The rotating mass 375 can further cooperate with a shock absorber assembly 350 to slow the moving step. The shock absorber assembly 350 (of FIGS. 5D and 5E) resist the moving step more just before completing the moving step than when initially commencing the moving step.

The method embodiment further comprises a step for stabilizing the slowing down step with an open toggle compression spring 380 cooperating with the rotating mass 375.

Another inventive aspect of the present invention is generally directed to an open/close indicator 106 that visually shows an onlooker that the vacuum switch 105 has continuity (is live), as mainly depicted in FIGS. 1A, 2A-2D though features and characteristics of the present embodiment are shown in all the other figures, contemplates a power line vacuum switch 105 comprising a vacuum bottle switch 200 and a vacuum bottle switch actuator 300. The vacuum bottle switch 200 includes a fixed electrical contact 210 and a dynamic electrical contact 212, as shown in FIGS. 3A and 3B. The vacuum bottle switch actuator 300 includes a linkage assembly 364 that is configured to drive the power line vacuum switch 105 in an open orientation defined when the dynamic electrical contact 212 is separated from the fixed electrical contact 210 and in a closed orientation when the dynamic electrical contact 212 is contacting the fixed electrical contact 210. The power line vacuum switch 105 further includes an indicator shaft 325 that extends orthogonally from the linkage assembly 364 (see FIG. 4C), wherein the indicator shaft 325 is rotated in a first position when in the open orientation and in a second position when in the closed orientation. The indicator shaft 325 is rotated in the first and the second positions via the linkage assembly 364. An open/close indicator 106 is attached to the indicator shaft 325, covering a shaft distal end 324 of the indicator shaft 325. The open/close indicator 106 is configured to visibly show when the power line vacuum switch 105 is in the open orientation via the indicator shaft being rotated in the first position or the closed orientation when the indicator shaft 325 is rotated in the second position.

The power line vacuum switch 105 embodiment can be further envisioned, wherein the open/close indicator 106 comprises an indicia that is a first color, which in one embodiment can be green, indicating the open orientation and a second color, which can be red, indicating the closed orientation.

The power line vacuum switch 105 embodiment can be further envisioned comprising an actuator housing 302 that houses the vacuum bottle switch actuator 300, wherein the indicator shaft 325 extends outside of the actuator housing 302. This can further be wherein the open/close indicator 106 is cylindrically shaped with an indicator distal surface 315 extending away from the actuator housing 302, an indicator proximal side 266 facing the actuator housing 302 and an indicator side surface 270 between the indicator proximal side 266 and the indicator distal surface 268, the open/close indicator 106 comprises a bottom view indicia 307 visible on the indicator distal surface 268 that indicates when the power line vacuum switch 105 is in the open orientation or the closed orientation. Optionally, the indicator side surface 270 can comprise a side view indicia 309 that an electrical technician can see if up on the electrical pole 155 or on a ladder at, or near, the level of the power line vacuum switch 105. As further shown in FIG. 1D, the indicator distal surface 268 faces downwards when the power line vacuum switch 105 is connected to a powerline 156. With more specificity to the embodiment of FIG. 2D, the open/close indicator 106 comprises an indicator distal surface window 262 in the indicator distal surface 268 through which the bottom view indicia 307 is viewable and an indicator side surface window 264 in the indicator side surface 270 through which the side view indicia 309 is viewable, the indicia 307 and 309 are configured to rotate with the indicator shaft 325.

In yet another open/close indicator embodiment 106 a vacuum switch arrangement 105 can comprise a fixed electrical contact 210 and a dynamic electrical contact 212 disposed in a vacuum bottle 220. A linkage assembly 364 that is inside of a vacuum bottle switch actuator 300, moves the dynamic electrical contact 212 from an open orientation, where the dynamic electrical contact 212 is spaced apart from the fixed electrical contact 210, to a closed orientation, where the dynamic electrical contact 212 is in contact with the fixed electrical contact 210. An indicator shaft 325 is connected to and extends orthogonally from the linkage assembly 364. The indicator shaft 325 is configured to rotate 256 between a first position and a second position via the linkage assembly 364, wherein the open orientation corresponds to the indicator shaft 325 being in the first position and the closed orientation corresponds to the indicator shaft 325 in the closed position. An open/close indicator 106 is attached to the indicator shaft 325, wherein the open/close indicator 106 visibly displays an open orientation indicia 254 when the indicator shaft 325 is in the first position and a closed orientation indicia 252 when the indicator shaft 325 is in the second position.

The vacuum switch arrangement 105 embodiment can be further envisioned, wherein the open orientation indicia 254 is green and the closed orientation indicia 252 is red.

In another configuration, the vacuum switch arrangement 105 embodiment is further envisions the open/close indicator 106 further comprising an indicator housing 265 that is defined by cylindrical side surface 270 that extends between a housing proximal side 266 and a housing distal side 268, wherein the housing proximal side 266 faces the vacuum bottle switch actuator 300. There can be at least one distal surface window 262 in the housing distal side 268 and at least one side surface window 264 in the housing side surface 270. In this embodiment, an indicator hub 350 can be arranged to fit inside of the indicator housing 265 in a rotating relationship, wherein the indicator hub 350 can include at least one bottom view visual indicator 307 that lines up with a side view visual indicator 309. This can further be wherein the at least one bottom view visual indicator 307 is viewable through the at least one distal surface window 262 and the side view visual indicator 309 is viewable through the at least one side surface window 264. And/or, the indicator hub 350 can be attached to a shaft distal end 324 of the indicator shaft 325. In one configuration, the indicator hub 350 is captured in the indicator housing 265. In yet another configuration, the housing distal surface 268 faces downwards when the power line vacuum switch 105 is connected to a powerline 156, so that an onlooker can see if the vacuum switch 105 is live before attempting to open the disconnect blade 136 with a hot stick (not shown).

Certain aspects of yet another open/close indicator embodiment 106 envision a method of using a vacuum switch arrangement 105 having a fixed electrical contact 210 and a dynamic electrical contact 212 disposed in a vacuum bottle 220, a linkage assembly 364 that is inside of a vacuum bottle switch actuator 300, an indicator shaft 325 connected to and extending orthogonally from the linkage assembly 364, and an open/close indicator 106 attached to the indicator shaft 325. The method envisions moving the dynamic electrical contact 212 from an open orientation, where the dynamic electrical contact 212 is spaced apart from the fixed electrical contact 210, to a closed orientation, where the dynamic electrical contact 212 is in contact with the fixed electrical contact 210 (see FIGS. 3A and 3B). This moving step will cause the indicator shaft 325 to rotate about an axis 272 between a first position and a second position via the linkage assembly 364. The open orientation corresponds to the indicator shaft 325 being in the first position and the closed orientation corresponds to the indicator shaft 325 being in the closed position. Once rotated, the open/close indicator embodiment 106 visibly displays an open orientation indicia 254 when the indicator shaft 325 is in the first position and a closed orientation indicia 252 when the indicator shaft 325 is in the second position.

The method embodiment further contemplates that the indicator shaft 325 is fixedly connected to an indicator hub 250 that is inside of an indicator housing 265, that the indicator shaft 325 rotates the indicator hub 250 inside of the indicator housing 265 between the first position and the second position, that the indicator housing 265 does not rotate, wherein the open/close indicator 106 comprises the indicator hub 250 and the indicator housing 265.

The method embodiment further contemplates the open/close indicator 106 visibly displaying the open orientation indicia 254 and the closed orientation indicia 252 at an indicator distal surface 268 of the open/close indicator 106. The open/close indicator 106 can further visibly display the open orientation or the closed orientation via a side view visual indicator 309.

The above embodiments are not intended to be limiting to the scope of the invention whatsoever because many more embodiments are easily conceived within the teachings and scope of the instant description. Moreover, the corresponding elements in the above example should not be considered limiting.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms used herein. For example, though embodiments of the present invention describe an underarm vacuum break switch arrangement 100, certain inventive elements can be equally applied to other kinds of vacuum break switch arrangements without departing from the scope and spirit of the present invention. It should also be appreciated that the appropriate mechanical and electrical components not discussed in detail in the present disclosure must be implemented in accordance known to those skilled in the art. The specification and drawings are to be regarded as illustrative and exemplary rather than restrictive. For example, the word "preferably," and the phrase "preferably but not necessarily," are used synonymously herein to consistently include the meaning of "not necessarily" or optionally. "Comprising," "including," and "having," are intended to be open-ended terms.

It will be clear that the claimed invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the claimed invention disclosed and as defined in the appended claims. Accordingly, it is to be understood that even though numerous characteristics and advantages of various aspects have been set forth in the foregoing description, together with details of the structure and function, this disclosure is illustrative only, and changes may be made in detail, especially in matters of structure and arrangement to the full extent indicated by the broad general meaning of the terms in which the appended claims are expressed.

What is claimed is:

1. A power line vacuum switch comprising:
   a vacuum bottle switch that includes a fixed electrical contact and a dynamic electrical contact;
   a vacuum bottle switch actuator that includes a linkage assembly,
   the linkage assembly configured to drive the power line vacuum switch in an open orientation defined when the dynamic electrical contact is separated from the fixed electrical contact and in a closed orientation when the dynamic electrical contact is contacting the fixed electrical contact;
   an indicator shaft extending orthogonally from the linkage assembly, the indicator shaft is rotated in a first position when in the open orientation and in a second position when in the closed orientation, the indicator shaft is rotated in the first and the second positions via the linkage assembly;
   an open/close indicator attached to the indicator shaft at a shaft distal end of the indicator shaft, the open/close indicator configured to visibly show when the power line vacuum switch is in the open orientation or the closed orientation via the indicator shaft being rotated.

2. The power line vacuum switch of claim 1, wherein the open/close indicator covers the shaft distal end of the indicator shaft.

3. The power line vacuum switch of claim 1, wherein the open/close indicator comprises an indicia that is a first color indicating the open orientation and a second color indicating the closed orientation.

4. The power line vacuum switch of claim 3, wherein the first color is green and the second color is red.

5. The power line vacuum switch of claim 1 further comprising an actuator housing that houses the vacuum bottle switch actuator, the indicator shaft extends outside of the actuator housing.

6. The power line vacuum switch of claim 5, wherein the open/close indicator is cylindrically shaped with an indicator distal surface extending away from the actuator housing, an indicator proximal side facing the actuator housing and an indicator side surface between the indicator proximal side and the indicator distal surface, the open/close indicator comprises a bottom view indicia visible on the indicator distal surface that indicates when the power line vacuum switch is in the open orientation or the closed orientation.

7. The power line vacuum switch of claim 6, wherein the indicator side surface comprises a side view indicia.

8. The power line vacuum switch of claim 6, wherein the indicator distal surface faces downwards when the power line vacuum switch is connected to a powerline.

9. The power line vacuum switch of claim 7, wherein the open/close indicator comprises an indicator distal surface window in the indicator distal surface through which the bottom view indicia is viewable and an indicator side surface window in the indicator side surface through which the side view indicia is viewable, the indicia are configured to rotate with the indicator shaft.

10. A vacuum switch arrangement comprising:
a fixed electrical contact and a dynamic electrical contact disposed in a vacuum bottle;
a linkage assembly, inside of a vacuum bottle switch actuator, that moves the dynamic electrical contact from an open orientation, where the dynamic electrical contact is spaced apart from the fixed electrical contact, to a closed orientation, where the dynamic electrical contact is in contact with the fixed electrical contact;
an indicator shaft connected to and extending orthogonally from the linkage assembly,
the indicator shaft configured to rotate between a first position and a second position via the linkage assembly,
the open orientation corresponds to the indicator shaft being in the first position and the closed orientation corresponds to the indicator shaft being in the closed position;
an open/close indicator attached to the indicator shaft at a shaft distal end of the indicator shaft, the open/close indicator visibly displays an open orientation indicia when the indicator shaft is in the first position and a closed orientation indicia when the indicator shaft is in the second position.

11. The vacuum switch arrangement of claim 10, wherein the open orientation indicia is green and the closed orientation indicia is red.

12. The vacuum switch arrangement of claim 10, wherein the open/close indicator further comprising:
an indicator housing that is defined by cylindrical side surface that extends between a housing proximal side and a housing distal side, the housing proximal side faces the vacuum bottle switch actuator,
at least one distal surface window in the housing distal side and at least one side surface window in the cylindrical side surface,
an indicator hub that fits inside of the indicator housing in a rotating relationship,
the indicator hub including at least one bottom view visual indicator that lines up with a side view visual indicator.

13. The vacuum switch arrangement of claim 12, wherein the at least one bottom view visual indicator is viewable through the at least one distal surface window and the side view visual indicator is viewable through the at least one side surface window.

14. The vacuum switch arrangement of claim 12, wherein the indicator hub is attached to the shaft distal end of the indicator shaft.

15. The vacuum switch arrangement of claim 12, wherein the indicator hub is captured in the indicator housing.

16. The vacuum switch arrangement of claim 12, wherein the housing distal side faces downwards when the power line vacuum switch is connected to a powerline.

17. A method comprising:
providing a vacuum switch arrangement having a fixed electrical contact and a dynamic electrical contact disposed in a vacuum bottle,
a linkage assembly inside of a vacuum bottle switch actuator,
an indicator shaft connected to and extending orthogonally from the linkage assembly, and
an open/close indicator attached to the indicator shaft at a shaft distal end of the indicator shaft;
moving the dynamic electrical contact from an open orientation, where the dynamic electrical contact is spaced apart from the fixed electrical contact, to a closed orientation, where the dynamic electrical contact is in contact with the fixed electrical contact;
rotating the indicator shaft between a first position and a second position via the linkage assembly, the rotating is about an axis,
the open orientation corresponds to the indicator shaft being in the first position and the closed orientation corresponds to the indicator shaft being in the closed position;
visibly displaying an open orientation indicia via the open/close indicator when the indicator shaft is in the first position; and
visibly displaying a closed orientation indicia via the open/close indicator when the indicator shaft is in the second position.

18. The method of claim 17, wherein the indicator shaft fixedly connected to an indicator hub that is inside of an indicator housing, the indicator shaft rotating the indicator hub inside of the indicator housing between the first position and the second position, the indicator housing does not rotate, the open/close indicator comprising the indicator hub and the indicator housing.

19. The method of claim 17, wherein the open/close indicator visibly displays the open orientation indicia and the closed orientation indicia at an indicator distal surface of the open/close indicator.

20. The method of claim 19, wherein the open/close indicator further visibly displays the open orientation or the closed orientation via a side view visual indicator.

* * * * *